United States Patent
Toi et al.

(10) Patent No.: US 11,757,377 B2
(45) Date of Patent: Sep. 12, 2023

(54) POWER CONVERSION DEVICE

(71) Applicant: Mitsubishi Electric Corporation, Tokyo (JP)

(72) Inventors: Takato Toi, Tokyo (JP); Takuya Kajiyama, Tokyo (JP); Toshiyuki Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/791,904

(22) PCT Filed: Mar. 17, 2020

(86) PCT No.: PCT/JP2020/011610
§ 371 (c)(1),
(2) Date: Jul. 11, 2022

(87) PCT Pub. No.: WO2021/186524
PCT Pub. Date: Sep. 23, 2021

(65) Prior Publication Data
US 2023/0051706 A1 Feb. 16, 2023

(51) Int. Cl.
*H02M 7/539* (2006.01)
*H02J 3/01* (2006.01)
*H02M 1/12* (2006.01)

(52) U.S. Cl.
CPC .............. *H02M 7/539* (2013.01); *H02J 3/01* (2013.01); *H02M 1/12* (2013.01)

(58) Field of Classification Search
CPC ...... H02J 3/1857; H02M 1/4233; H02M 1/12; H02M 7/219
See application file for complete search history.

(56) References Cited

U.S. PATENT DOCUMENTS

2016/0308357 A1* 10/2016 Yuan ..................... H02M 1/12
2016/0349717 A1    12/2016 Tadano
(Continued)

FOREIGN PATENT DOCUMENTS

| JP | 5-49172 A | 2/1993 |
| WO | 2015/115623 A1 | 8/2015 |

OTHER PUBLICATIONS

International Search Report and Written Opinion dated Jun. 23, 2020, received for PCT Application PCT/JP2020/011610, filed on Mar. 17, 2020, 8 pages including English Translation.

*Primary Examiner* — Jared Fureman
*Assistant Examiner* — Esayas G Yeshaw
(74) *Attorney, Agent, or Firm* — XSENSUS LLP

(57) ABSTRACT

A power conversion device includes: a power converter connected to an AC grid to which a load is connected; and a control circuit. The control circuit includes a harmonic compensation unit that includes a current command generation unit and a limit coefficient calculation unit and compensates for harmonic current contained in load current. The current command generation unit generates compensation current desired values for respective frequency components, and corrects the compensation current desired values using corresponding limit coefficients, to generate compensation current commands for respective frequency components. The limit coefficient calculation unit calculates each limit coefficient, on the basis of the compensation current desired value for each frequency component, and maximum voltage and maximum current that the power converter can output.

20 Claims, 28 Drawing Sheets

(56) References Cited

U.S. PATENT DOCUMENTS

| | | | |
|---|---|---|---|
| 2019/0044427 A1* | 2/2019 | Fujii | H02M 7/797 |
| 2021/0257957 A1* | 8/2021 | Zhang | H02J 3/1842 |
| 2021/0367503 A1* | 11/2021 | Agirman | H02P 27/08 |

* cited by examiner

POWER CONVERSION DEVICE

CROSS-REFERENCE TO RELATED APPLICATION

The present application is based on PCT filing PCT/JP2020/011610, filed Mar. 17, 2020, the entire contents of which are incorporated herein by reference.

TECHNICAL FIELD

The present disclosure relates to a power conversion device.

BACKGROUND ART

In an AC grid to which a load is connected, a power conversion device is connected for compensating for harmonic currents. In a conventional power conversion device, harmonic detection means provided for each harmonic order detects a harmonic component in load current separately on a harmonic-order basis, and a compensation current command value for each harmonic is generated to perform output control of the power conversion device. Thus, the compensation ratio can be easily set, and a compensation gain and a compensation capacitance limiter can be set individually for each order, whereby it is possible to compensate for only a harmonic for a specific order (see, for example, Patent Document 1).

CITATION LIST

Patent Document

Patent Document 1: Japanese Laid-Open Patent Publication No. 5-049172

SUMMARY OF THE INVENTION

Problems to be Solved by the Invention

In the conventional power conversion device, harmonic compensation can be performed by setting a limit individually for each harmonic order, but in some cases, voltage and current that the power conversion device can output cannot be sufficiently used.

The present disclosure has been made to solve the above problem, and an object of the present disclosure is to provide a power conversion device that effectively performs harmonic compensation for each harmonic order while promoting usage of voltage and current that the power conversion device can output.

Solution to the Problems

A power conversion device according to the present disclosure includes: a power converter connected to an AC grid to which a load is connected; and a control circuit for performing output control of the power converter. The control circuit includes a harmonic compensation unit for compensating for harmonic current contained in load current by compensation current, and controls the compensation current in output current of the power converter. The harmonic compensation unit includes a current command generation unit and a limit coefficient calculation unit. The current command generation unit generates a compensation current desired value for each of a plurality of frequency components, and corrects each compensation current desired value using a corresponding limit coefficient, to generate a compensation current command for each frequency component. The limit coefficient calculation unit calculates each limit coefficient, on the basis of the compensation current desired value for each of the plurality of frequency components, and maximum voltage and maximum current that the power converter is able to output.

Effect of the Invention

The power conversion device according to the present disclosure makes it possible to effectively perform harmonic compensation for each harmonic order while promoting usage of voltage and current that the power conversion device can output.

DESCRIPTION OF EMBODIMENTS

Embodiment 1

Figure 1:
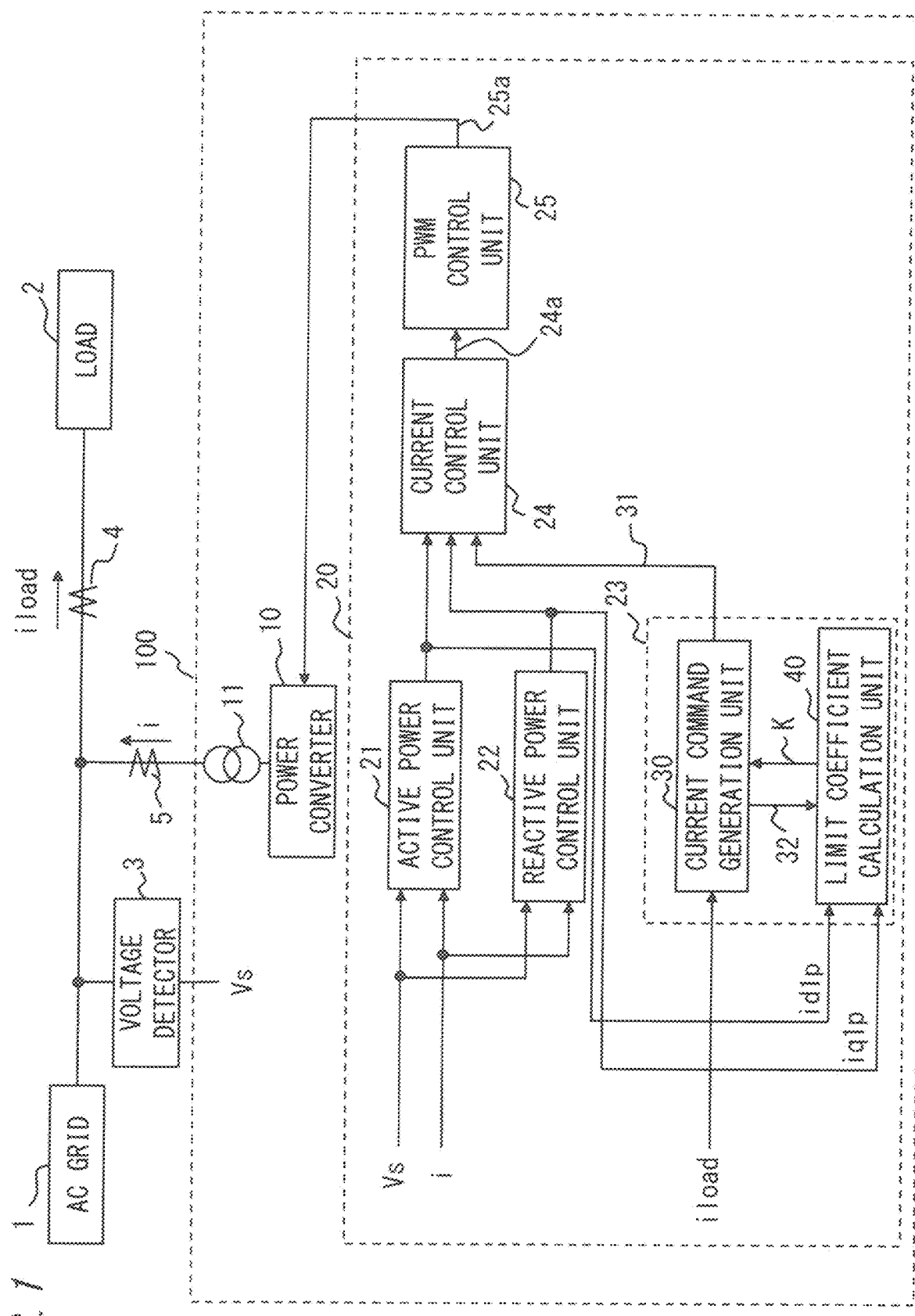
FIG. 1 is a block diagram showing a schematic configuration of a power conversion device according to embodiment 1.

FIG. 1 is a block diagram showing a schematic configuration of a power conversion device according to embodiment 1.

As shown in FIG. 1, in a power system in which a load 2 is connected to a three-phase (U phase, V phase, W phase) AC grid 1, a power conversion device 100 is connected to the AC grid 1, in parallel to the load 2. The power conversion device 100 includes a power converter 10 and a control circuit 20 for performing output control of the power converter 10, and the power converter 10 is connected to the AC grid 1 via a transformer 11.

A voltage detector 3 and current detectors 4, 5 are provided for detecting voltage and currents at respective parts. The voltage detector 3 detects interconnection point voltage Vs (Vsu, Vsv, Vsw) which is voltage of the AC grid 1 interconnected with the power converter 10. The current detector 4 detects load current iload (iloadu, iloadv, iloadw) flowing from the AC grid 1 to the load 2, and the current detector 5 detects output current i (iu, iv, iw) outputted from the power converter 10 to the AC grid 1.

The control circuit 20 performs switching control of switching elements in the power converter 10 on the basis of input information (interconnection point voltage Vs, load current iload, output current i) from the voltage detector 3 and the current detectors 4, 5, thereby performing output control of the power converter 10.

The control circuit 20 includes an active power control unit 21, a reactive power control unit 22, a harmonic compensation unit 23, a current control unit 24, and a pulse width modulation (PWM) control unit 25.

In the present embodiment, a case of outputting a fundamental positive-phase-sequence component (first-order positive-phase-sequence component) and also compensating for harmonics will be described. Here, frequency components other than a fundamental positive-phase-sequence component, i.e., including a fundamental negative-phase-sequence component, are treated as harmonics.

The active power control unit 21 and the reactive power control unit 22 generate an active current command id1$p$ and a reactive current command iq1$p$ as a first current command for the fundamental positive-phase-sequence component. The active power control unit 21 and the reactive power control unit 22 each receive values of interconnection point voltage Vs and output current i from the voltage detector 3 and the current detector 5. Then, the active power control unit 21 generates a d-axis current command as the active current command id1$p$ for the fundamental positive-phase-sequence component on the basis of active power of the AC grid 1. The reactive power control unit 22 generates a q-axis current command as the reactive current command iq1$p$ for the fundamental positive-phase-sequence component on the basis of reactive power of the AC grid 1.

The harmonic compensation unit 23 includes a current command generation unit 30 and a limit coefficient calculation unit 40, and generates compensation current commands 31 for compensating for a plurality of frequency components that are harmonic currents by compensation currents.

The current command generation unit 30 receives a value of the load current iload from the current detector 4 and a limit coefficient K generated for each frequency component by the limit coefficient calculation unit 40. Then, the current command generation unit 30 generates a compensation current desired value 32 for each of the plurality of frequency components on the basis of the load current iload, and corrects the compensation current desired value 32 using the limit coefficient K, to generate the compensation current command 31.

The limit coefficient calculation unit 40 receives the active current command id1$p$ and the reactive current command iq1$p$ from the active power control unit 21 and the reactive power control unit 22, and the compensation current desired values 32 from the current command generation unit 30, and generates the limit coefficient K for each frequency component on the basis of the received values.

The current control unit 24 receives the active current command id1$p$ and the reactive current command iq1$p$ from the active power control unit 21 and the reactive power control unit 22, and the compensation current commands 31 from the harmonic compensation unit 23, and generates a voltage command 24$a$ on the basis of an output current command obtained by adding the received values. On the basis of the voltage command 24$a$, the PWM control unit 25 performs comparison using a carrier wave, to generate a gate signal 25$a$ for switching elements in the power converter 10.

Figure 2:
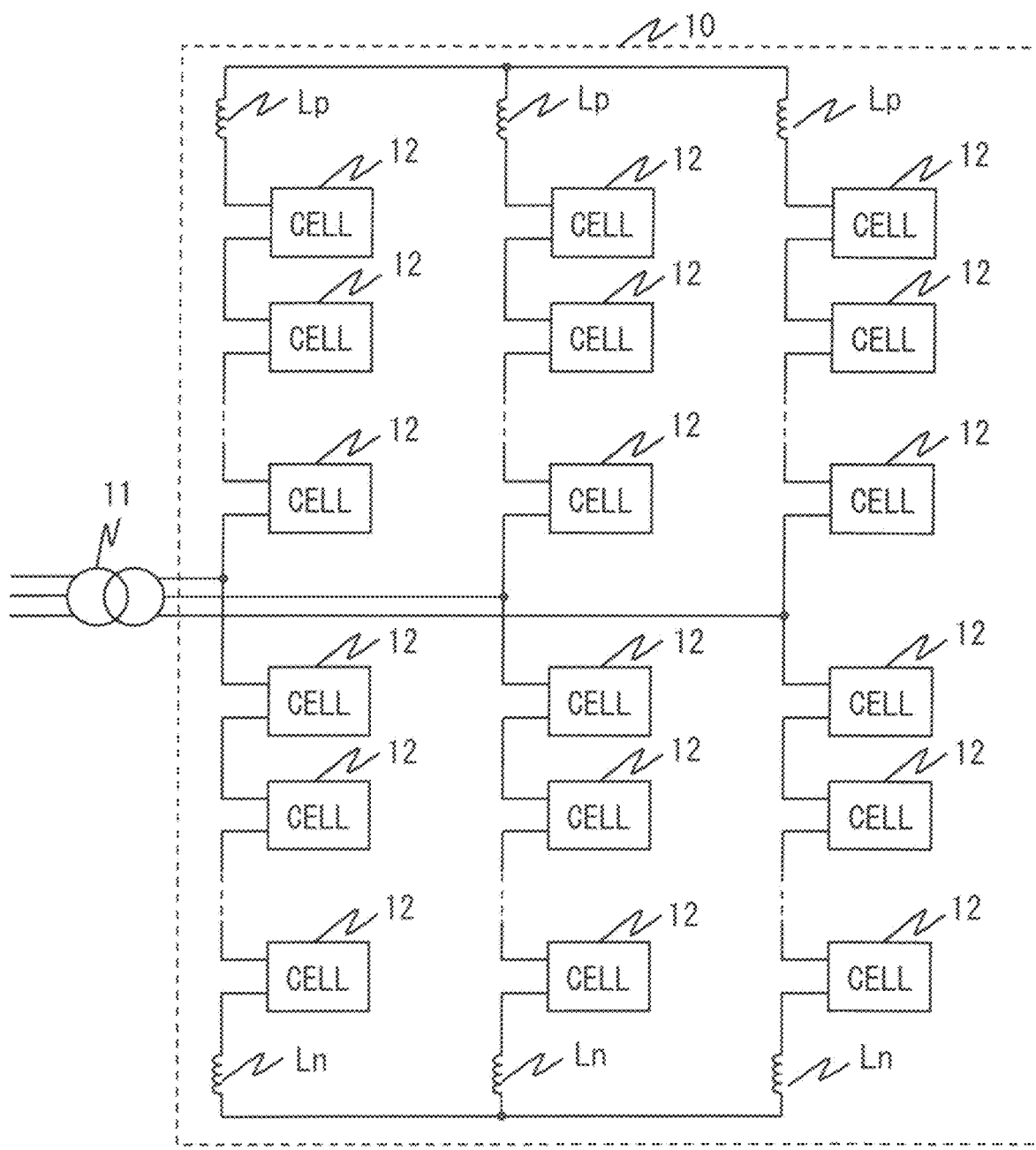
FIG. 2 shows an example of a circuit configuration of a power converter according to embodiment 1.

FIG. 2 shows an example of a circuit configuration of the power converter 10.

As shown in FIG. 2, the power converter 10 is configured as a modular multilevel converter (MMC) of a double-star-connection type. In this case, the power converter 10 includes a plurality of converter cells 12 connected in series in each of upper and lower arms for each of three phases connected by double star connection which is an example of star connection, and includes arm reactors Lp, Ln on the positive side and the negative side.

Figure 3:
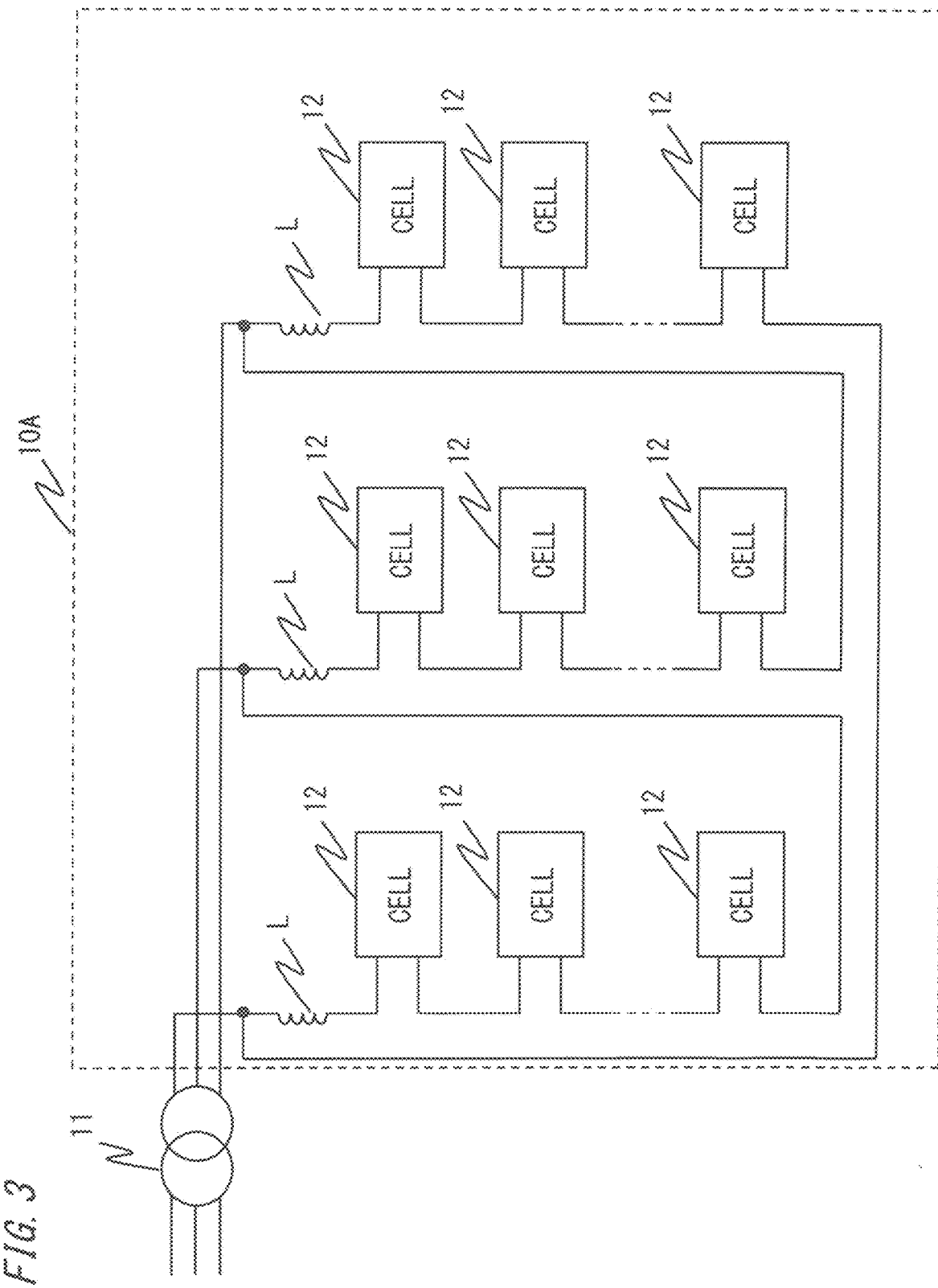
FIG. 3 shows another example of a circuit configuration of a power converter according to embodiment 1.

The power converter may have a circuit configuration of a power converter 10A shown in FIG. 3. As shown in FIG. 3, the power converter 10A is configured as a MMC of a delta-connection type. The power converter 10A includes a plurality of converter cells 12 connected in series in each of arms for each of three phases connected by delta connection, and includes arm reactors L.

Figure 4:
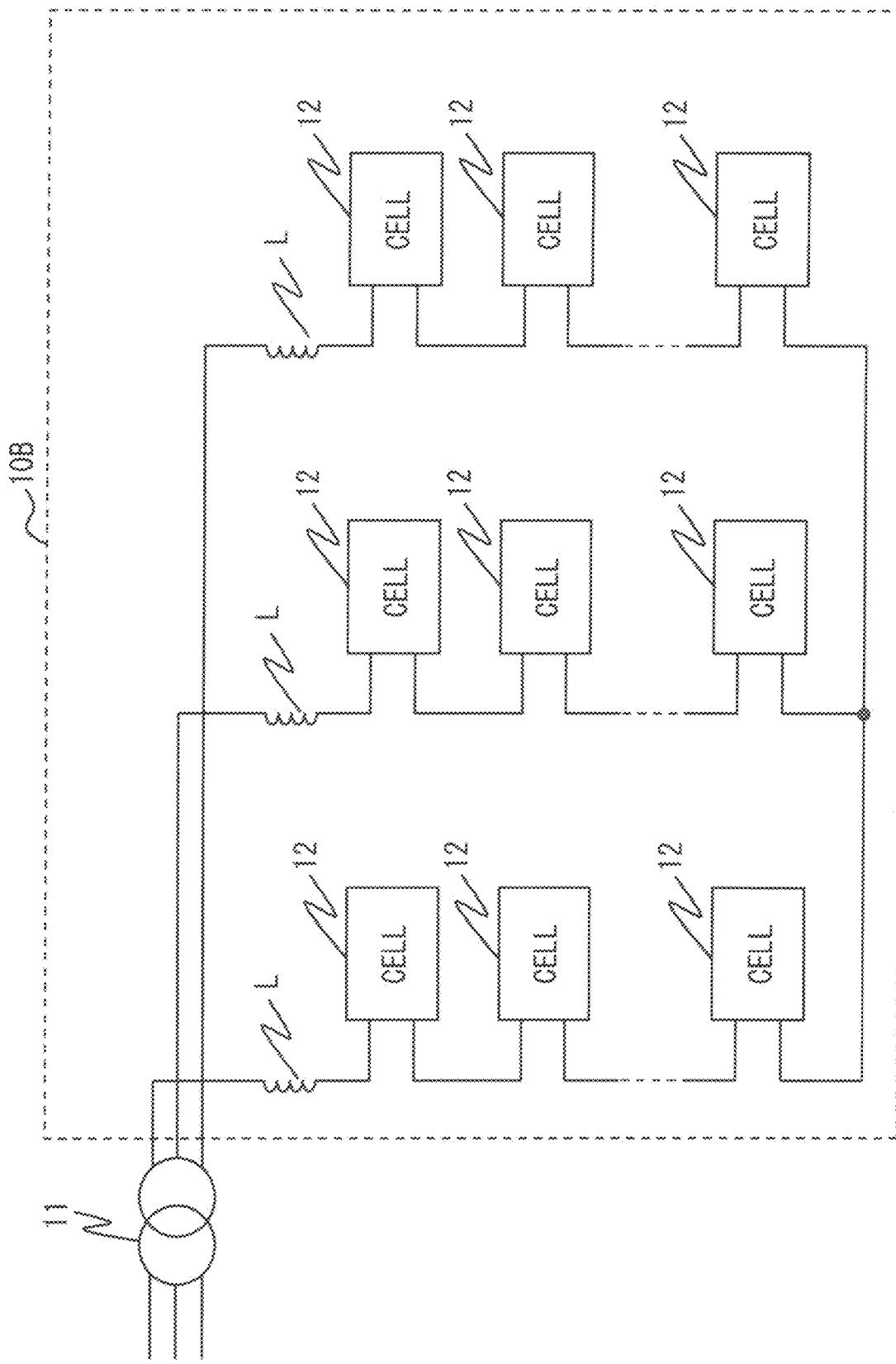
FIG. 4 shows another example of a circuit configuration of a power converter according to embodiment 1.

Further, the power converter may have a circuit configuration of a power converter 10B shown in FIG. 4. As shown in FIG. 4, the power converter 10B is configured as a MMC of a single-star-connection type which is another example of star connection. The power converter 10B includes a plurality of converter cells 12 connected in series in each of arms for each of three phases connected by single star connection, and includes arm reactors L.

Figure 5:
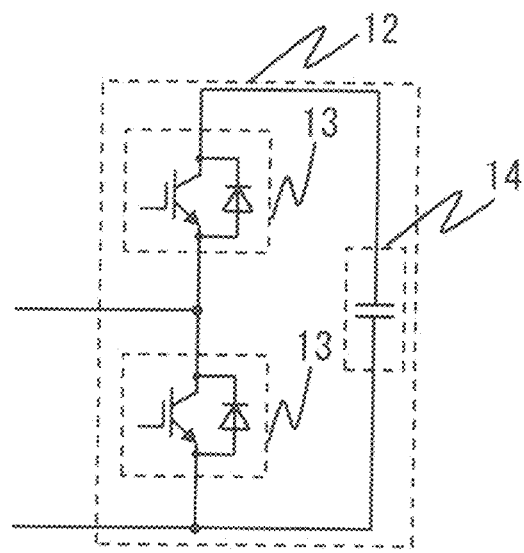
FIG. 5 shows an example of a circuit configuration of a converter cell in the power converter according to embodiment 1.

FIG. 5 shows an example of a circuit configuration of the converter cell 12 in the power converter 10, 10A.

As shown in FIG. 5, the converter cell 12 is configured as a half-bridge circuit having two switching elements 13 to which diodes are connected in antiparallel, and a DC capacitor 14. The switching elements 13 are self-turn-off switching elements such as insulated-gate bipolar transistors (IGBT), for example. In the converter cell 12, a connection point between the two switching elements 13 and a DC terminal on the negative side are used as output ends, and two kinds of voltages, i.e., zero voltage and voltage across the DC capacitor 14 are outputted through switching of the switching elements 13.

Figure 6:
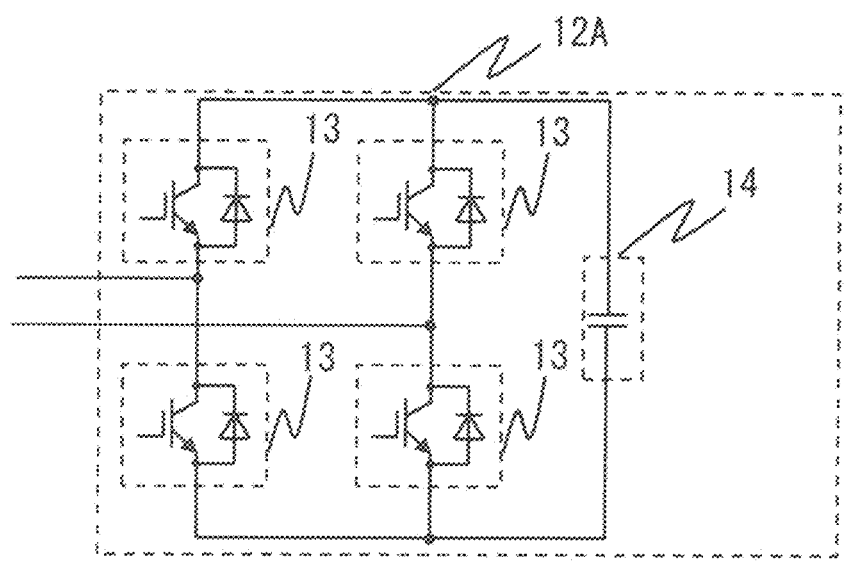
FIG. 6 shows another example of a circuit configuration of a converter cell in the power converter according to embodiment 1.

The converter cell may have a circuit configuration of a converter cell 12A shown in FIG. 6. As shown in FIG. 6, the converter cell 12A is configured as a full-bridge circuit in which two legs each formed by series-connection of two switching elements 13 to which diodes are connected in antiparallel are connected in parallel with a DC capacitor 14. In the converter cell 12A, a connection point between the two switching elements 13 in each leg is used as an output end, and three kinds of voltages, i.e., zero voltage and positive and negative voltages across the DC capacitor 14 are outputted through switching of the switching elements 13.

Figure 7:
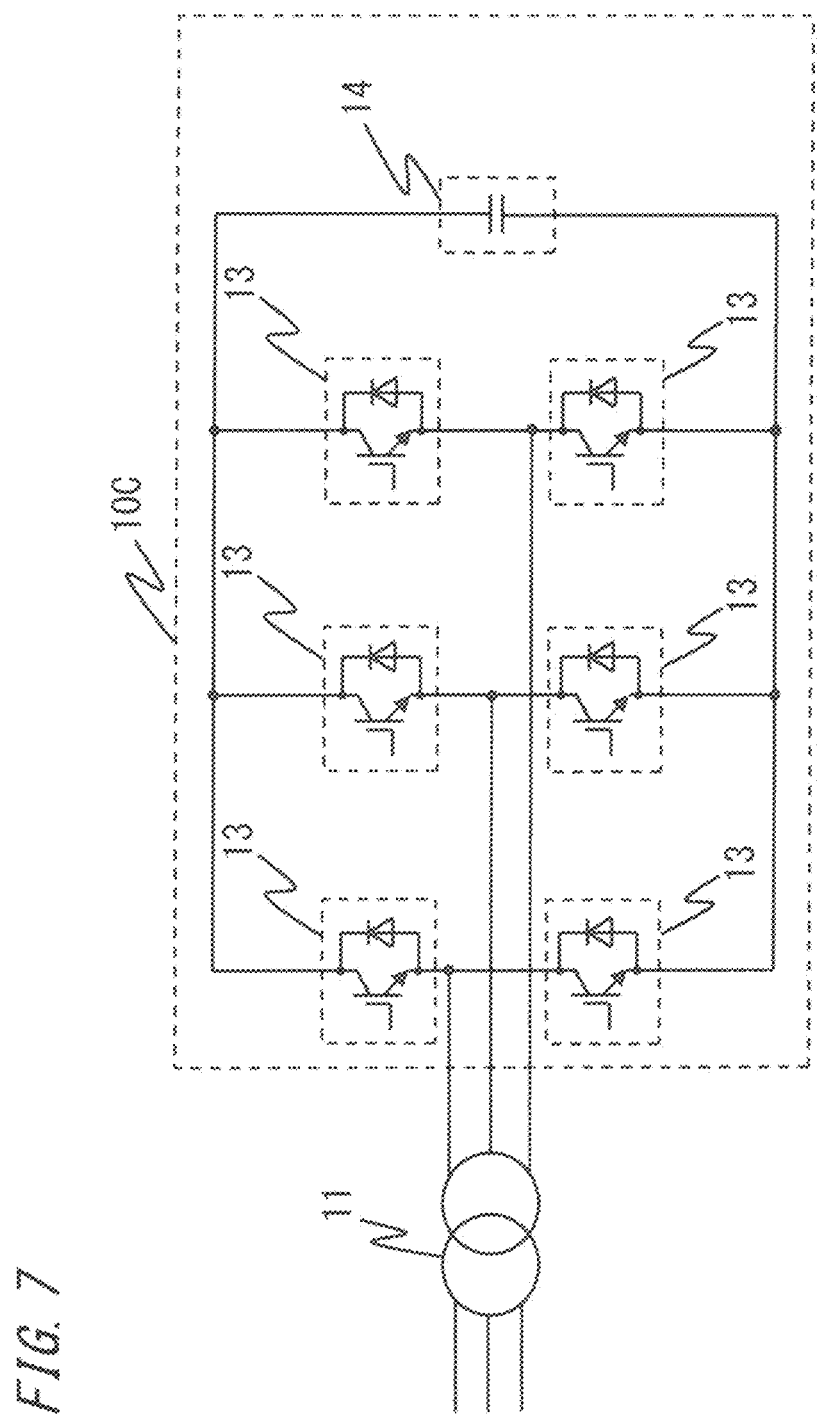
FIG. 7 shows another example of a circuit configuration of a power converter according to embodiment 1.

The power converter of the power conversion device 100 may have a circuit configuration of a power converter 10C shown in FIG. 7. As shown in FIG. 7, the power converter 10C is configured as a three-phase 2-level inverter in which three legs each formed by series connection of two switching elements 13 to which diodes are connected in antiparallel are connected in parallel with the DC capacitor 14. A connection point between the two switching elements 13 in each leg is used as an output end for each phase, and positive or negative voltage of the DC capacitor 14 is outputted for each phase through switching of the switching elements 13.

The power conversion device 100 is used for a static synchronous compensator (STATCOM), an active filter, a high voltage direct current (HVDC) system for performing high-voltage DC power transmission, or the like.

The power converter 10 configured as the MMC of a double-star-connection type and the power converter 10C configured as a three-phase 2-level inverter are used for an active filter, a STATCOM, a HVDC system, or the like. The active filter is a device for compensating for a harmonic component in the AC grid 1, and the STATCOM is a device for compensating for reactive power in the AC grid 1. The HVDC system is used for a grid of which the power transmission distance is long, and is a system in which power of an AC grid is forward converted to high-voltage DC power to be transmitted and then the DC power is inversely converted to AC power to be transmitted to another AC grid.

The power converter 10A configured as the MMC of a delta-connection type is used for a distribution-STATCOM (D-STATCOM) for power distribution. The D-STATCOM performs reactive power compensation in a low-order grid close to a load.

The power converter 10B configured as the MMC of a single-star-connection type is used for an active filter, a STATCOM, or the like.

In a case where the power conversion device 100 is used for a device such as the STATCOM or the HVDC system that outputs a fundamental positive-phase-sequence component with highest priority given thereto, it is necessary to perform harmonic compensation while considering the fundamental positive-phase-sequence component outputted from the power converter 10. In addition, since voltage that the power converter 10 can output is limited, it is necessary to appropriately set a limiter for compensation current included in the output current i of the power converter 10, also for preventing overmodulation.

Hereinafter, the configuration and operation of the harmonic compensation unit 23 will be described in detail. The power conversion device 100 according to the present embodiment outputs a fundamental positive-phase-sequence component and also compensates for harmonics with a priority set for each frequency component.

Figure 8:
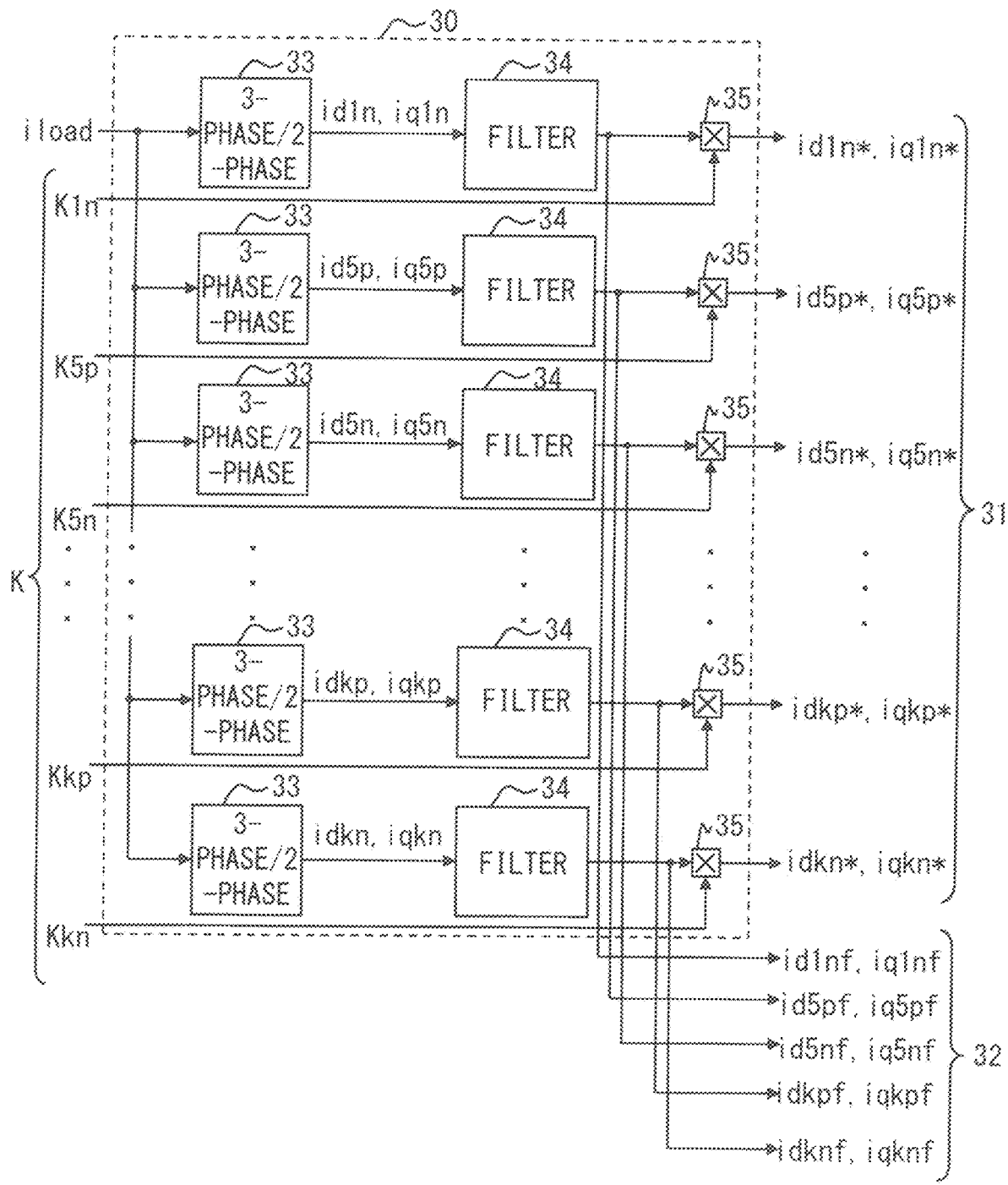
FIG. 8 shows a configuration of a current command generation unit of the power conversion device according to embodiment 1.

FIG. 8 shows a configuration of the current command generation unit 30 of the harmonic compensation unit 23.

The current command generation unit 30 includes a plurality of coordinate conversion units 33 that perform 3-phase/2-phase rotational coordinate conversion to extract a plurality of frequency components that are harmonic compensation targets, on the basis of the load current iload, and further includes a plurality of filters 34 and a plurality of multipliers 35.

The three-phase load currents iload are subjected to rotational coordinate conversion by each of the plurality of coordinate conversion units 33, to be converted to DC currents for the plurality of frequency components. The plurality of coordinate conversion units 33 are set with different phases for coordinate conversion. For example, in a case of performing conversion to dq-axis currents $id1n$, $iq1n$ of a fundamental negative-phase-sequence component, coordinate conversion is performed with a negative fundamental component phase, and in a case of performing conversion to dq-axis currents $id5p$, $iq5p$ of a fifth-order positive-phase-sequence component, coordinate conversion is performed with a positive fifth-order component phase. In this case, the fundamental negative-phase-sequence component, the fifth-order positive-phase-sequence component, a fifth-order negative-phase-sequence component, . . . , a kth-order positive-phase-sequence component, and a kth-order negative-phase-sequence component are compensation targets, and dq-axis currents ($id1n$, $iq1n$), ($id5p$, $iq5p$), ($id5n$, $iq5n$), . . . , ($idkp$, $iqkp$), and ($idkn$, $iqkn$) are generated.

The dq-axis currents generated for each frequency component pass the filter 34 by which harmonic components are removed from DC current so that only the frequency component that is the compensation target is extracted. Thus, for the respective frequency components, the compensation current desired values 32, i.e., ($id1nf$, $iq1nf$), ($id5pf$, $iq5pf$), ($id5nf$, $iq5nf$), . . . , ($idkpf$, $iqkpf$), and ($idknf$, $iqknf$) are generated.

Then, at the multiplier 35, the compensation current desired value 32 for each frequency component is multiplied by the limit coefficient K (K1$n$, K5$p$, K5$n$, ..., K$k$p, and K$k$n) generated for each frequency component by the limit coefficient calculation unit 40. Thus, for the respective frequency components, the compensation current commands 31, i.e., (id1$n$*, iq1$n$*), (id5$p$*, iq5$p$*), (id5$n$*, iq5$n$*), ..., (id$k$p*, iq$k$p*), and (id$k$n*, iq$k$n*) are generated.

Figure 9:
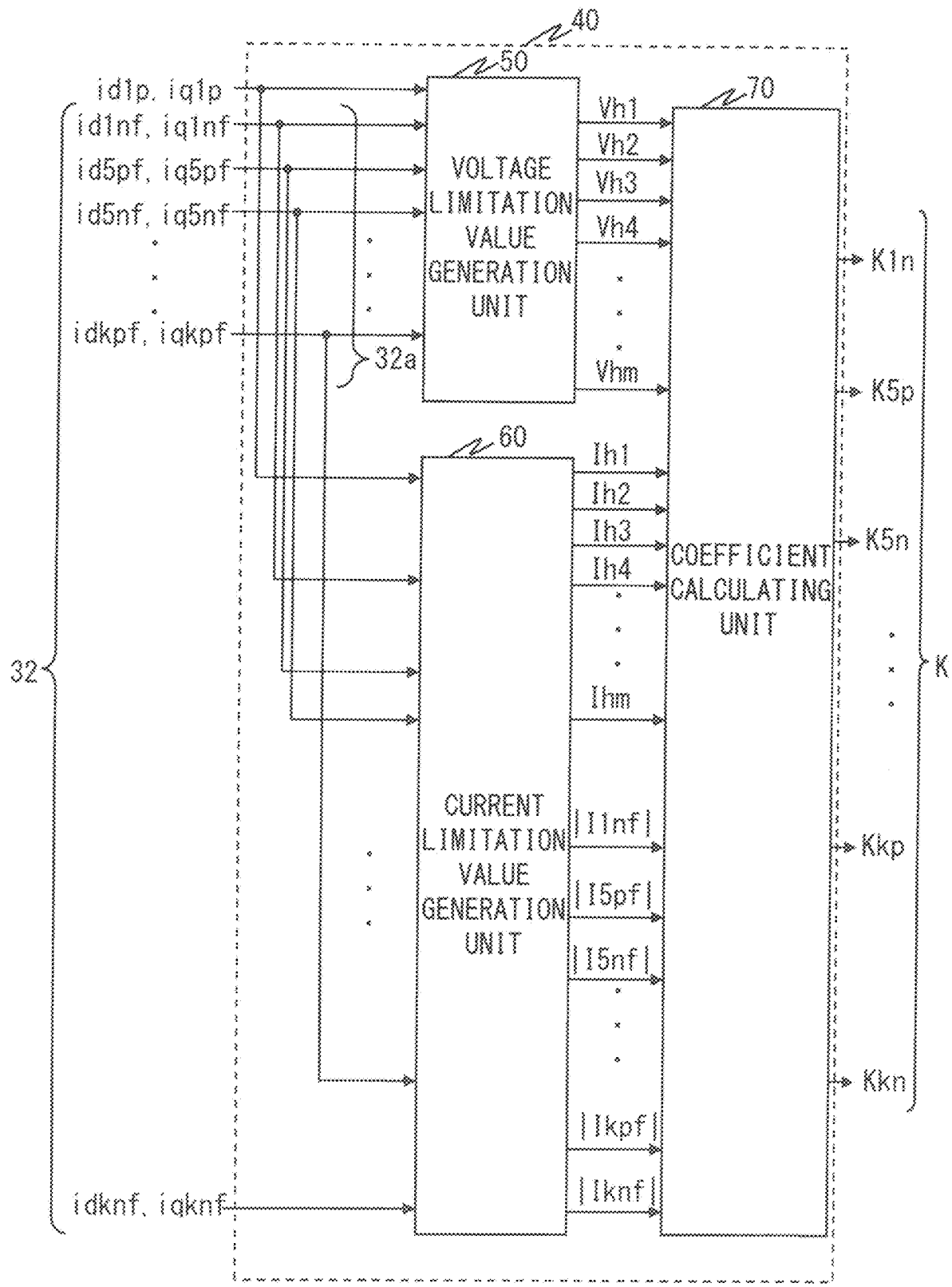
FIG. 9 shows a configuration of a limit coefficient calculation unit of the power conversion device according to embodiment 1.

FIG. 9 shows a configuration of the limit coefficient calculation unit 40 of the harmonic compensation unit 23.

The limit coefficient calculation unit 40 includes a voltage limitation value generation unit 50, a current limitation value generation unit 60, and a coefficient calculating unit 70. The limit coefficient calculation unit 40 receives the active current command id1$p$ and the reactive current command iq1$p$ from the active power control unit 21 and the reactive power control unit 22, and the compensation current desired values 32 from the current command generation unit 30, and generates the limit coefficients K (K1$n$, K5$p$, K5$n$, ..., K$k$p, and K$k$n) for the respective frequency components on the basis of the received values.

Figure 10:
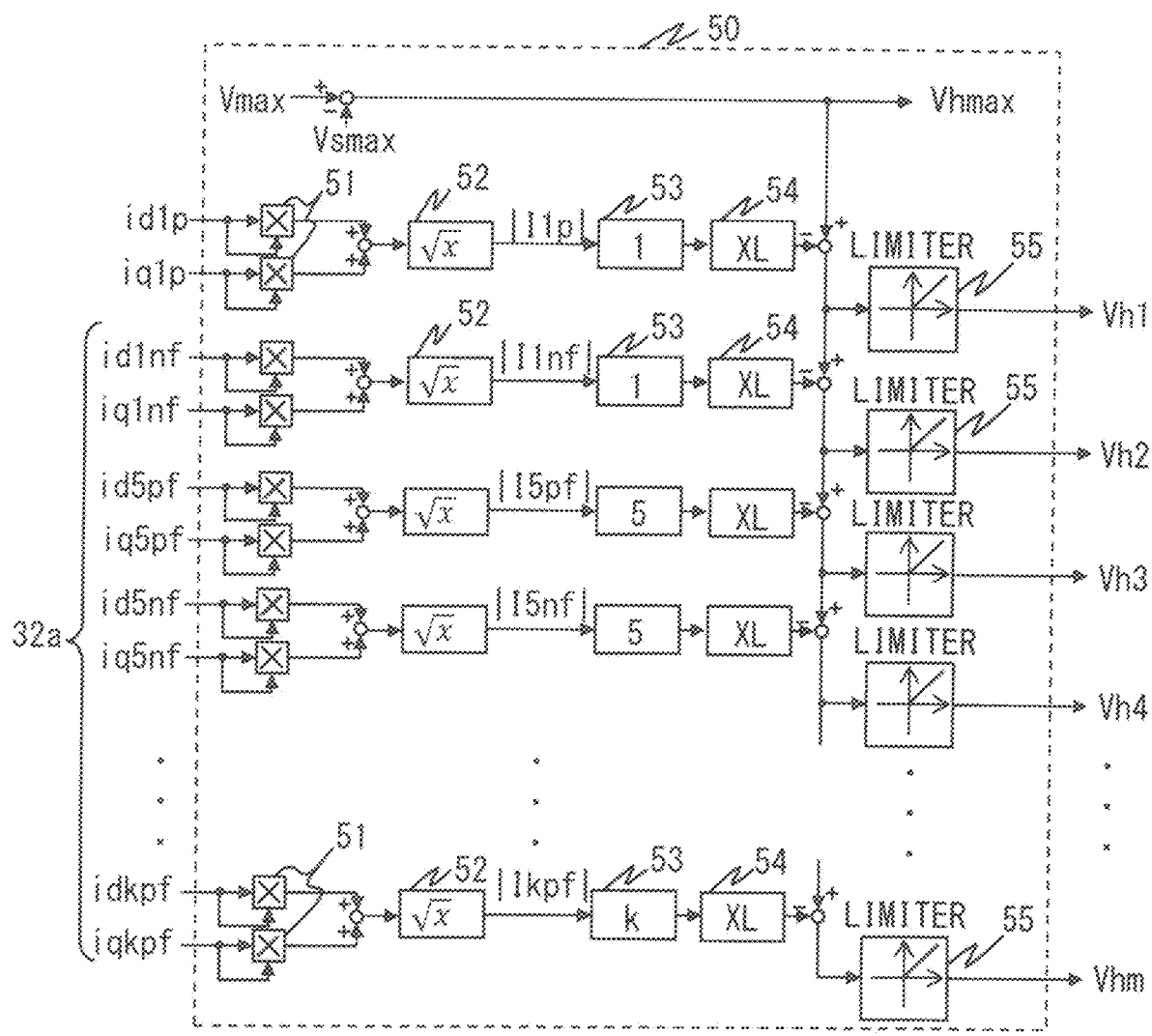
FIG. 10 shows a configuration of a voltage limitation value generation unit in the limit coefficient calculation unit according to embodiment 1.
Figure 11:
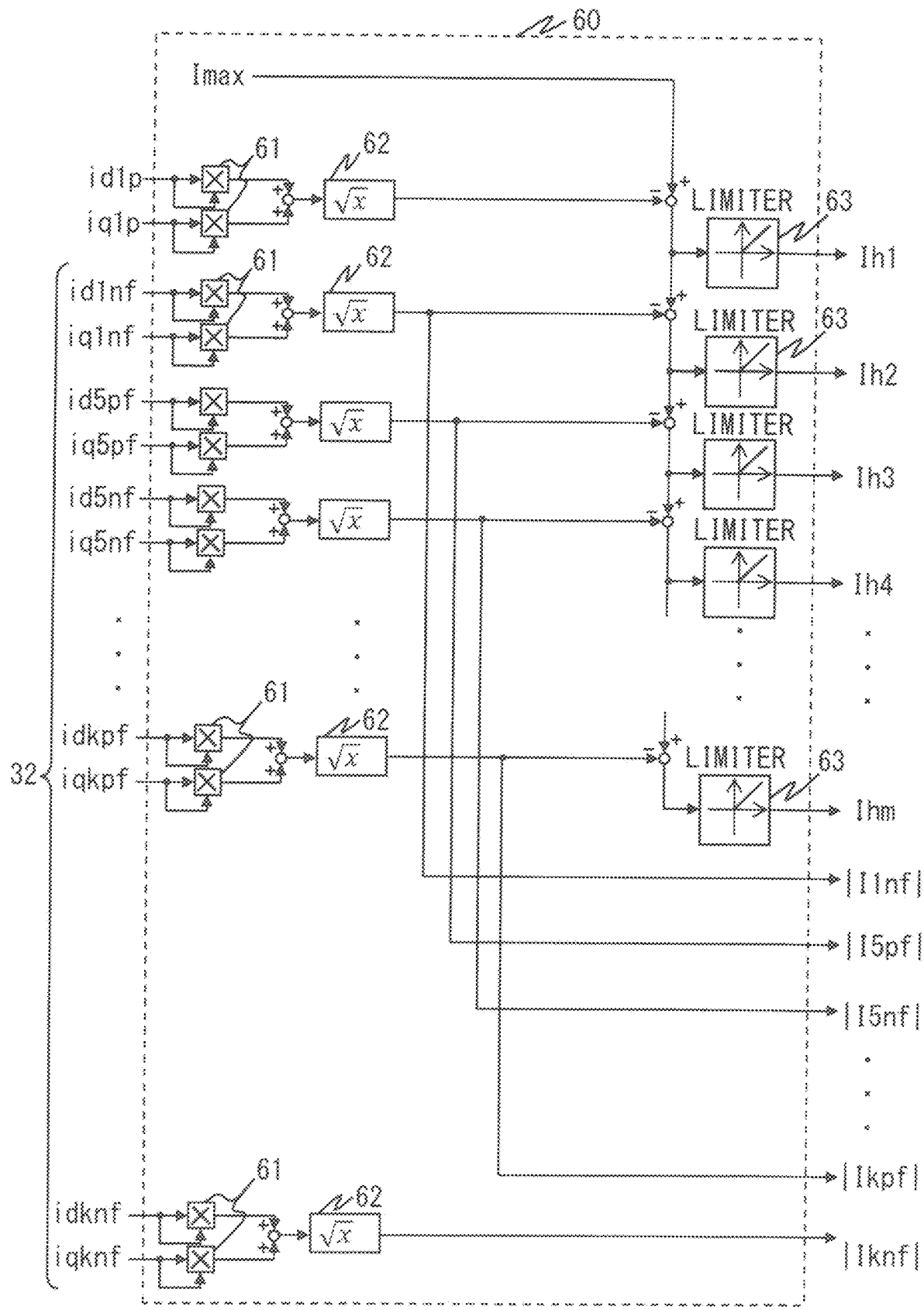
FIG. 11 shows a configuration of a current limitation value generation unit in the limit coefficient calculation unit according to embodiment 1.
Figure 12:
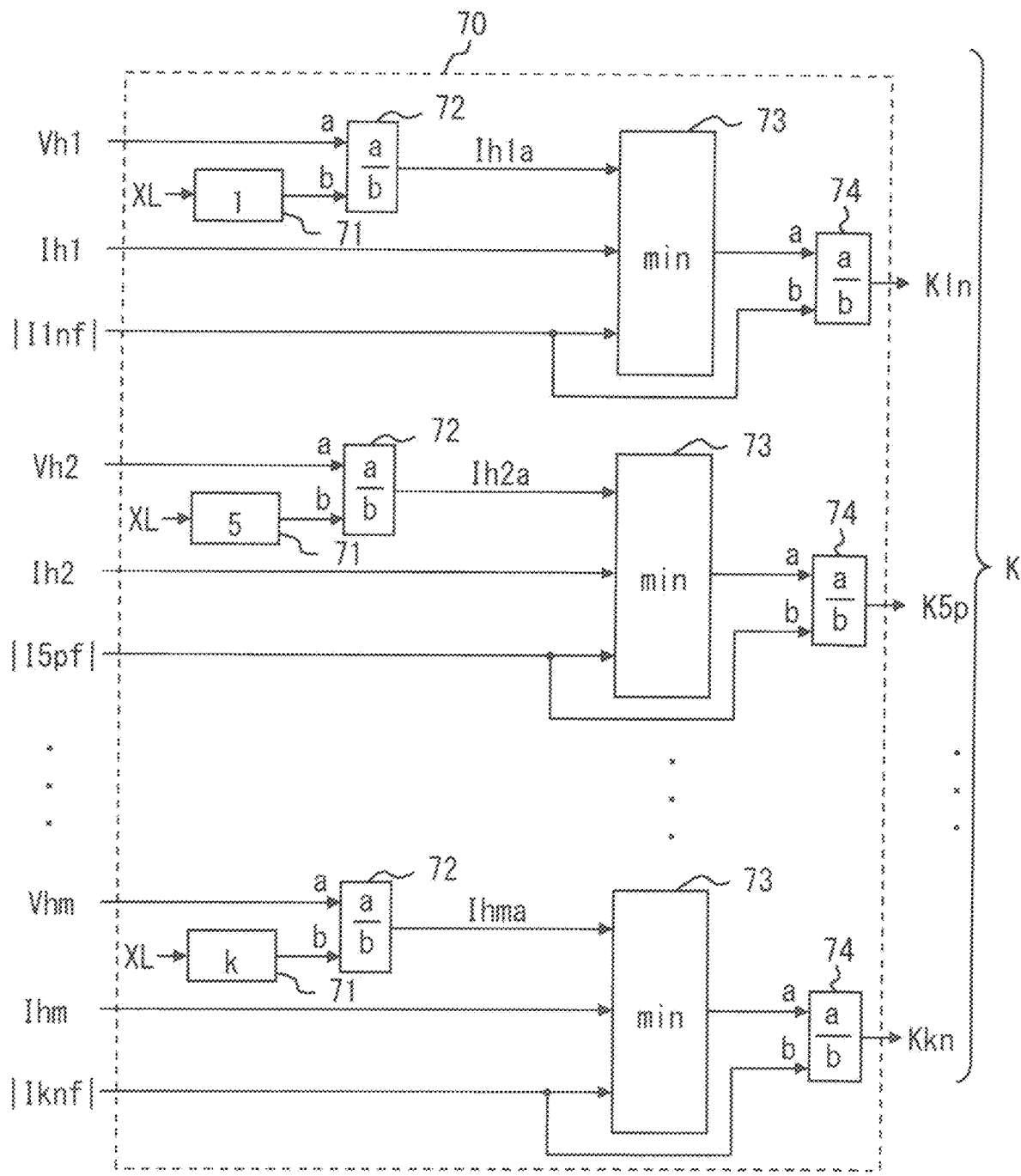
FIG. 12 shows a configuration of a coefficient calculating unit in the limit coefficient calculation unit according to embodiment 1.

FIG. 10 shows a configuration of the voltage limitation value generation unit 50 in the limit coefficient calculation unit 40, and FIG. 11 shows a configuration of the current limitation value generation unit 60 in the limit coefficient calculation unit 40. FIG. 12 shows a configuration of the coefficient calculating unit 70 in the limit coefficient calculation unit 40.

Regarding harmonics to be compensated for by the harmonic compensation unit 23, a priority of harmonic compensation is set for each of the plurality of frequency components, and in the limit coefficient calculation unit 40, the voltage limitation value generation unit 50 and the current limitation value generation unit 60 generate voltage upper limit values Vh1 to Vhm and current upper limit values Ih1 to Ihm for the respective frequency components, in the order of the priorities.

As shown in FIG. 9 and FIG. 10, in the voltage limitation value generation unit 50, a grid voltage maximum value Vsmax is subtracted from maximum voltage Vmax that the power converter 10 can output, thereby calculating voltage Vhmax that can be used for control of the power converter 10.

The voltage limitation value generation unit 50 receives the active current command id1$p$ and the reactive current command iq1$p$, and compensation current desired values 32$a$ ((id1$nf$, iq1$nf$), (id5$pf$, iq5$pf$), (id5$nf$, iq5$nf$), ..., (id$k$pf, iq$k$pf)) excluding the $k$th-order negative-phase-sequence component having the lowest priority among the compensation current desired values 32 from the current command generation unit 30.

In the voltage limitation value generation unit 50, the received d-axis and q-axis currents of each frequency component are squared by multipliers 51, and a square root of a sum obtained by adding the squared values is calculated by a square root calculator 52, thereby generating current amplitude values |I1$p$|, |I1$nf$|, |I5$pf$|, |I5$nf$|, ..., |I$k$pf|. Then, at constant multipliers 53, 54, each current amplitude value is multiplied by a constant corresponding to the order number of the current and a fundamental impedance XL of a reactor in the transformer 11, thereby calculating voltage needed for outputting each current amplitude value, i.e., voltage to be allocated for each frequency component.

Further, the voltage limitation value generation unit 50 subtracts the voltage to be allocated for the fundamental positive-phase-sequence component from the voltage Vhmax, and then performs limiter processing for making a negative value be zero by a limiter 55, thereby calculating the voltage upper limit value Vh1 for the frequency component for which harmonic compensation is performed with the priority set at the first rank, in this case, the fundamental negative-phase-sequence component. Then, from the voltage upper limit value Vh1 before the limiter processing, the voltage to be allocated for the fundamental negative-phase-sequence component is subtracted, and the resultant value is similarly subjected to limiter processing, thus calculating the voltage upper limit value Vh2 for the frequency component of which the priority is at the second rank, in this case, the fifth-order positive-phase-sequence component.

Similarly, for each frequency component that is the compensation target, the voltage to be allocated for the frequency component is calculated, and this voltage is subtracted from the voltage upper limit value before limiter processing, to calculate the voltage upper limit value for the frequency component of which the priority is at the next rank.

Thus, the voltage upper limit values Vh1, Vh2, Vh3, Vh4, ..., Vhm are generated in the order of priorities from the first rank. The generated voltage upper limit values are inputted to the coefficient calculating unit 70.

In a case where the voltage value inputted to the limiter 55 is a negative value, the output voltage of the power converter 10 has already exceeded the usable voltage, and therefore the voltage value is made to be zero by limiter processing and calculation of voltage upper limit values is not performed for the subsequent frequency components.

As shown in FIG. 9 and FIG. 11, the current limitation value generation unit 60 receives the active current command id1$p$ and the reactive current command iq1$p$, and the compensation current desired values 32 ((id1$nf$, iq1$nf$), (id5$pf$, iq5$pf$), (id5$nf$, iq5$nf$), ..., (id$k$pf, iq$k$pf), and (id$k$nf, iq$k$nf)) from the current command generation unit 30.

Regarding the received dq-axis currents of each frequency component, the d-axis and q-axis currents are squared by multipliers 61, and a square root of a sum obtained by adding the squared values is calculated by a square root calculator 62, thereby generating current amplitude values |I1$p$|, |I1$nf$|, |I5$pf$|, |I5$nf$|, ..., |I$k$pf|, and |I$k$nf|. The current amplitude values are currents to be allocated for the respective frequency components.

Further, the current limitation value generation unit 60 subtracts the current amplitude value |I1$p$| which is the current to be allocated for the fundamental positive-phase-sequence component from maximum current Imax that the power converter 10 can output, and then performs limiter processing for making a negative value be zero by a limiter 63, thus calculating the current upper limit value Ih1 for the frequency component for which harmonic compensation is performed with the priority set at the first rank, in this case, the fundamental negative-phase-sequence component. Then, from the current upper limit value Ih1 before the limiter processing, the current amplitude value |I1$nf$| which is the current to be allocated for the fundamental negative-phase-sequence component is subtracted, and the resultant value is similarly subjected to limiter processing, thus calculating the current upper limit value Ih2 for the frequency component of which the priority is at the second rank, in this case, the fifth-order positive-phase-sequence component.

Similarly, for each frequency component that is the compensation target, the current (current amplitude value) to be allocated for the frequency component is calculated, and this current is subtracted from the current upper limit value before limiter processing, to calculate the current upper limit value for the frequency component of which the priority is at the next rank.

Thus, the current limitation value generation unit 60 generates the current upper limit values Ih1, Ih2, Ih3, Ih4, . . . , Ihm for the respective frequency components that are the compensation targets, in the order of priorities from the first rank. Then, the generated current upper limit values Ih1, Ih2, Ih3, Ih4, . . . , Ihm and the generated current amplitude values |I1$nf$|, |I5$pf$|, |I5$nf$|, . . . , |Ik$pf$|, and |Ik$nf$| as second current values are outputted from the current limitation value generation unit 60 and inputted to the coefficient calculating unit 70.

In a case where the current value inputted to the limiter 63 is a negative value, the output current of the power converter 10 has already exceeded the usable current, and therefore the current value is made to be zero by limiter processing and calculation of current upper limit values is not performed for the subsequent frequency components. For the kth-order negative-phase-sequence component having the lowest priority, limiter processing is not performed after the current amplitude value |Ik$nf$| is calculated, and only the current amplitude value |Ik$nf$| is outputted.

As shown in FIG. 9 and FIG. 12, the coefficient calculating unit 70 receives the voltage upper limit values Vh1, Vh2, Vh3, Vh4, . . . , Vhm, the current upper limit values Ih1, Ih2, Ih3, Ih4, . . . , Ihm, and the current amplitude values |I1$nf$|, |I5$pf$|, |I5$nf$|, . . . , |Ik$pf$|, and |Ik$nf$| generated for the respective frequency components that are the compensation targets.

Then, for each frequency component, the limit coefficient is calculated using the voltage upper limit value, the current upper limit value, and the current amplitude value. For example, for the fundamental negative-phase-sequence component of which the priority is at the first rank, the fundamental impedance XL of the reactor in the transformer 11 is multiplied by a constant corresponding to the order number (in this case, 1) at a constant multiplier 71, thereby calculating an impedance corresponding to the order number. Then, the voltage upper limit value Vh1 is divided by the calculated impedance at a divider 72, thereby calculating a first current value Ih1$a$ which is a current limitation value based on the voltage upper limit value Vh1.

The calculated first current value Ih1$a$, the calculated current upper limit value Ih1, and the calculated current amplitude value |I1$nf$| are inputted to a minimum value extractor 73, and the minimum value extractor 73 extracts the minimum value among the three current values. This minimum value is divided by the current amplitude value |I1$nf$| at a divider 74, thereby calculating the limit coefficient K1$n$ which is the ratio of the minimum value to the current amplitude value |I1$nf$|.

Similarly, also regarding the other frequency components, the minimum values are extracted among the first current values Ih2$a$, . . . , Ihm$a$ calculated from the voltage upper limit values Vh2, . . . , Vhm and the impedances XL based on the frequencies, the current upper limit values Ih2, . . . , Ihm, and the current amplitude values |I5$pf$|, . . . , |Ik$nf$| for the respective frequency components, and the minimum values are divided by the current amplitude values |I5$pf$|, . . . , |Ik$nf$|, thereby calculating the limit coefficients K5$p$, . . . , Kk$n$.

The compensation current desired values 32 for respective frequency components are multiplied by the limit coefficients K (K1$n$, K5$p$, . . . , Kk$n$) generated as described above, that is, the compensation current desired values 32 are corrected using the limit coefficients K, whereby the compensation current commands 31 are generated.

As described above, in the present embodiment, the harmonic compensation unit 23 in the control circuit 20 generates the compensation current desired value 32 for each of the plurality of frequency components on the basis of the load current iload, and calculates each limit coefficient K on the basis of the compensation current desired value 32, and the maximum voltage Vmax and the maximum current Imax that the power converter 10 can output. Then, each compensation current desired value 32 is corrected using the corresponding limit coefficient K, thereby generating the compensation current command 31 for each frequency component.

Thus, while sufficient usage of the voltage and the current that the power converter 10 can output is promoted, the limit coefficient can be calculated individually in accordance with the order number of the compensation current, and thus it is possible to effectively perform harmonic compensation for each harmonic order. In addition, the limit coefficients can be calculated in real time in accordance with the operation condition of the power conversion device 100 and thus it is possible to perform control with high reliability and high accuracy.

In the present embodiment, in the harmonic compensation unit 23, for the frequency component that is the compensation target (e.g., first-order negative-phase-sequence component), the voltage upper limit value Vh1 and the current upper limit value Ih1 are calculated, the minimum value is extracted among the first current value Ih1$a$ based on the voltage upper limit value Vh1, the current upper limit value Ih1, and the current amplitude value |I1$nf$| of the compensation current desired value 32, and the minimum value is divided by the current amplitude value |I1$nf$|, thereby calculating the limit coefficient K1$n$. Thus, it is possible to generate the compensation current command 31 such that the usable voltage and current are not exceeded and can be sufficiently used, for each frequency component that is the compensation target.

In the present embodiment, in the harmonic compensation unit 23, a priority is set for each frequency component that is the compensation target, and the voltage upper limit value (e.g., Vh1) and the current upper limit value (e.g., Ih1) are calculated in a descending order of the priorities. Thus, the voltage and the current that can be used for the power converter 10 can be allocated from a frequency component having a higher priority, whereby harmonic compensation can be effectively performed.

In the present embodiment, the harmonic compensation unit 23 calculates the voltage upper limit value (Vh1) and the current upper limit value (Ih1) for the frequency component of which the priority is at the first rank, on the basis of the maximum voltage Vmax and the maximum current Imax that the power converter 10 can output and the first current command (active current command id1$p$ and reactive current command iq1$p$) for the fundamental positive-phase-sequence component. Then, for each frequency component that is the compensation target, the harmonic compensation unit 23 calculates voltage and current to be allocated for the frequency component, and subtracts the calculated voltage and current from the voltage upper limit value (e.g., Vh1) and the current upper limit value (e.g., Ih1), respectively, thereby calculating the voltage upper limit value (Vh2) and the current upper limit value (Ih2) for the frequency component of which the priority is at the next rank (e.g., second rank).

Thus, while the voltage and current that can be used for the power converter 10 are assuredly and accurately allocated from a frequency component having a higher priority, the voltage upper limit values (e.g., Vh1) and the current upper limit values (e.g., Ih1) can be calculated.

In the above embodiment, for the fundamental negative-phase-sequence component, the priority of harmonic compensation is set at the first rank. However, even in a case of another priority rank, the compensation current command 31 can be generated in the same manner and the same effects are obtained.

In the above description, the fundamental impedance XL is the impedance in the transformer 11, but impedances of the reactors L, Lp, Ln in the power converter 10 may be added thereto.

In the above embodiment, the harmonic compensation unit 23 generates the compensation current desired value 32 for each of the plurality of frequency components on the basis of the load current iload and generates the compensation current command 31. However, the compensation current desired value 32 may be generated from another control system. For example, on the basis of the interconnection point voltage Vs, the compensation current desired value 32 may be generated so as to reduce a harmonic component of the interconnection point voltage Vs.

Embodiment 2

In the above embodiment 1, the case where priorities of harmonic compensation are different among a plurality of frequency components, has been shown. In embodiment 2, a case where priorities are set at the same rank among a plurality of frequency components, will be described below. Also in embodiment 2, a schematic configuration of the power conversion device 100 is the same as that in the above embodiment 1 shown in FIG. 1, and while a fundamental positive-phase-sequence component is outputted, harmonic compensation is performed for each frequency component.

Hereinafter, the configuration and operation of the harmonic compensation unit 23 according to embodiment 2 will be described in detail.

As in the above embodiment 1, the harmonic compensation unit 23 includes a current command generation unit 30A and a limit coefficient calculation unit 40A, and generates the compensation current commands 31 for compensating for harmonic currents by compensation currents. In the present embodiment, a priority of harmonic compensation for the fundamental negative-phase-sequence component is set at the first rank, and priorities for the other components are all set at the same rank.

The current command generation unit 30A receives the value of the load current iload from the current detector 4 and the limit coefficient K generated for each frequency component by the limit coefficient calculation unit 40A. Then, the current command generation unit 30A generates the compensation current desired value 32 for each of the plurality of frequency components on the basis of the load current iload, and corrects the compensation current desired value 32 using the limit coefficient K, to generate the compensation current command 31.

Figure 13:
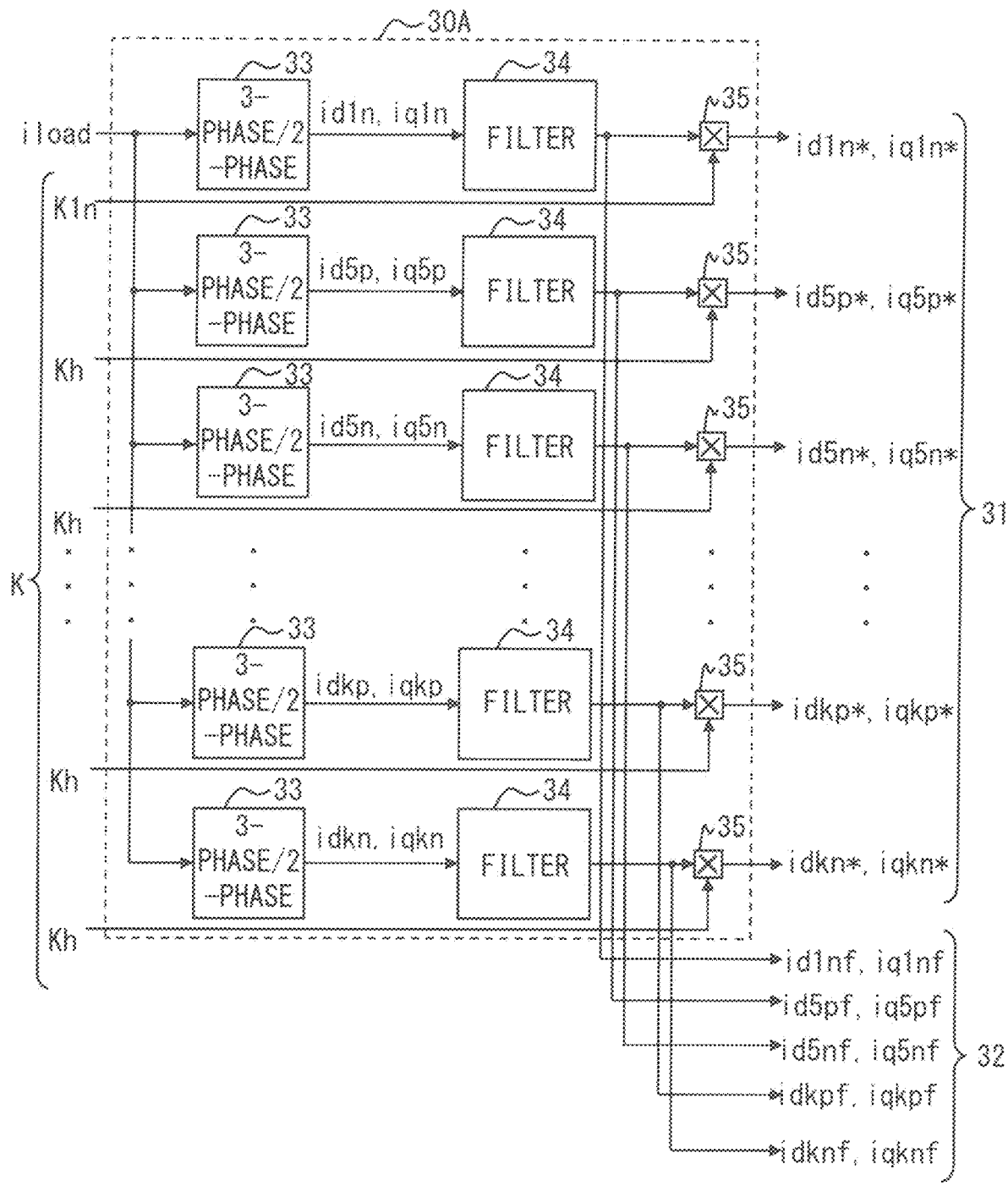
FIG. 13 shows a configuration of a current command generation unit of a power conversion device according to embodiment 2.
Figure 14:
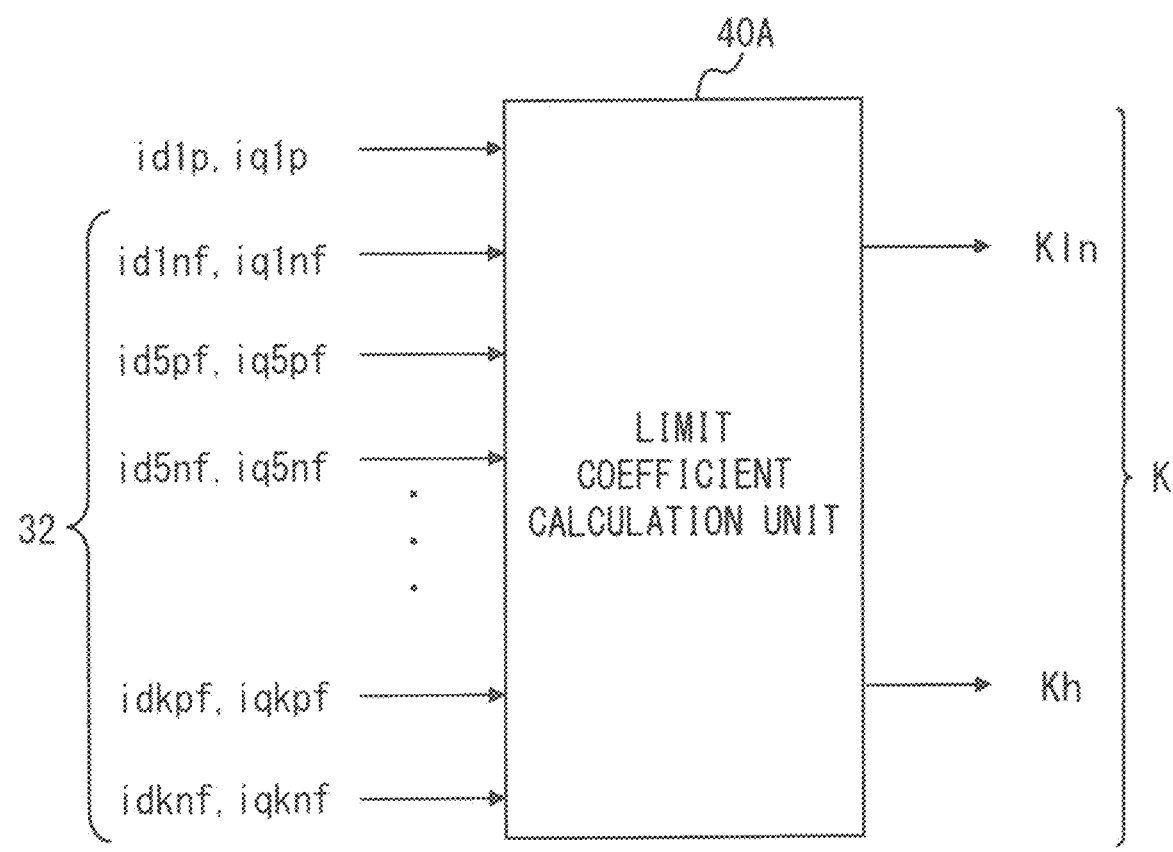
FIG. 14 shows a schematic configuration of a limit coefficient calculation unit of the power conversion device according to embodiment 2.

FIG. 13 shows a configuration of the current command generation unit 30A according to embodiment 2, and FIG. 14 shows a schematic configuration of the limit coefficient calculation unit 40A.

The current command generation unit 30A receives the value of the load current iload and the limit coefficient K (K1n, Kh) generated for each frequency component by the limit coefficient calculation unit 40A. In this case, since a priority of harmonic compensation for the fundamental negative-phase-sequence component is set at the first rank, and priorities for the other components are all set at the same rank, the limit coefficients Kh for the frequency components other than the fundamental negative-phase-sequence component are all equal to each other.

As in the above embodiment 1, the current command generation unit 30A includes the plurality of coordinate conversion units 33 that perform 3-phase/2-phase rotational coordinate conversion to extract a plurality of frequency components that are harmonic compensation targets, on the basis of the load current iload, and further includes the plurality of filters 34 and the plurality of multipliers 35.

The three-phase load currents iload are subjected to rotational coordinate conversion by each of the plurality of coordinate conversion units 33, to be converted to DC currents for the plurality of frequency components. The plurality of coordinate conversion units 33 are set with different phases for coordinate conversion. For example, in a case of performing conversion to the dq-axis currents id1$n$, iq1$n$ of the fundamental negative-phase-sequence component, coordinate conversion is performed with a negative fundamental component phase, and in a case of performing conversion to the dq-axis currents id5$p$, iq5$p$ of the fifth-order positive-phase-sequence component, coordinate conversion is performed with a positive fifth-order component phase. In this case, the fundamental negative-phase-sequence component, the fifth-order positive-phase-sequence component, the fifth-order negative-phase-sequence component, . . . , the kth-order positive-phase-sequence component, and the kth-order negative-phase-sequence component are compensation targets, and dq-axis currents (id1$n$, iq1$n$), (id5$p$, iq5$p$), (id5$n$, iq5$n$), . . . , (idkp, iqkp), (idkn, iqkn) are generated. The dq-axis currents generated for each frequency component pass the filter 34 by which harmonic components are removed from DC current so that only the frequency component that is the compensation target is extracted. Thus, for the respective frequency components, the compensation current desired values 32, i.e., (id1$nf$, iq1$nf$), (id5$pf$, iq5$pf$), (id5$nf$, iq5$nf$), . . . , (idkpf, iqkpf), (idknf, iqknf) are generated.

Then, at the multiplier 35, the compensation current desired value 32 for each frequency component is multiplied by the limit coefficient K (K1$n$, Kh) generated for each frequency component by the limit coefficient calculation unit 40A. Thus, for the respective frequency components, the compensation current commands 31, i.e., (id1$n$*, iq1$n$*), (id5$p$*, iq5$p$*), (id5$n$*, iq5$n$*), . . . , (idkp*, iqkp*), and (idkn*, iqkn*) are generated. In this case, the limit coefficients K (K1$n$, Kh) generated for the respective frequency components are the same except for the fundamental negative-phase-sequence component, and therefore two kinds of limit coefficients are used.

Figure 15:
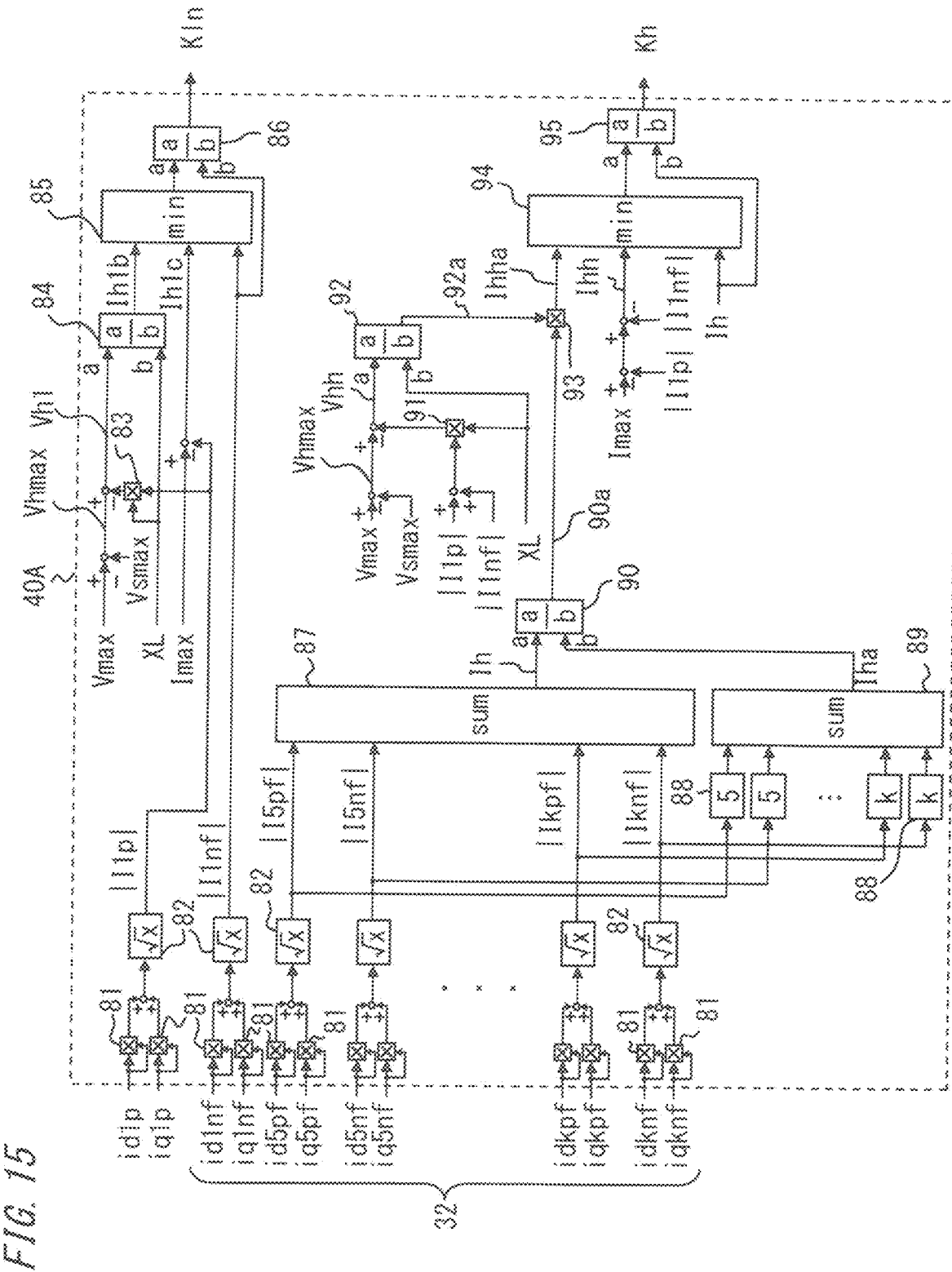
FIG. 15 shows a detailed configuration of the limit coefficient calculation unit of the power conversion device according to embodiment 2.

FIG. 15 shows a detailed configuration of the limit coefficient calculation unit 40A.

As shown in FIG. 15, the limit coefficient calculation unit 40A receives the active current command id1$p$ and the reactive current command iq1$p$, and the compensation current desired values 32 ((id1$nf$, iq1$nf$), (id5$pf$, iq5$pf$), (id5$nf$, iq5$nf$), . . . , (idkpf, iqkpf), and (idknf, iqknf)) from the current command generation unit 30A.

In the limit coefficient calculation unit 40A, the received d-axis and q-axis currents of each frequency component are squared by multipliers 81, and a square root of a sum obtained by adding the squared values is calculated by a square root calculator 82, thereby generating current amplitude values $|I1p|$, $|I1nf|$, $|I5pf|$, $|I5nf|$, ..., $|Ikpf|$, and $|Iknf|$.

In addition, the limit coefficient calculation unit 40A subtracts the grid voltage maximum value Vsmax from the maximum voltage Vmax that the power converter 10 can output, thereby calculating the voltage Vhmax that can be used for control of the power converter 10. In addition, at a constant multiplier 83, the current amplitude value $|I1p|$ of the fundamental positive-phase-sequence component is multiplied by the fundamental impedance XL of the reactor in the transformer 11, thereby calculating voltage needed for outputting the current amplitude value $|I1p|$, i.e., voltage to be allocated for the fundamental positive-phase-sequence component.

Then, the limit coefficient calculation unit 40A subtracts the voltage to be allocated for the fundamental positive-phase-sequence component from the voltage Vhmax, thereby calculating the voltage upper limit value Vh1 for the frequency component for which harmonic compensation is performed with the priority set at the first rank, in this case, the fundamental negative-phase-sequence component.

Then, the voltage upper limit value Vh1 is divided by the fundamental impedance XL at a divider 84, thereby calculating a first current value Ih1$b$ which is a current limitation value based on the voltage upper limit value Vh1.

In addition, the limit coefficient calculation unit 40A subtracts the current amplitude value $|I1p|$ which is current to be allocated for the fundamental positive-phase-sequence component from the maximum current Imax that the power converter 10 can output, thereby calculating a current upper limit value Ih1$c$ for the fundamental negative-phase-sequence component.

The calculated first current value Ih1$b$, the calculated current upper limit value Ih1$c$, and the calculated current amplitude value $|I1nf|$ of the fundamental negative-phase-sequence component as the second current value are inputted to a minimum value extractor 85, and the minimum value extractor 85 extracts the minimum value among the three current values. This minimum value is divided by the current amplitude value $|I1nf|$ at a divider 86, thereby calculating the limit coefficient K1$n$ which is the ratio of the minimum value to the current amplitude value $|I1nf|$.

The limit coefficient Kh for the frequency component group of which the priorities are at the second rank or below is calculated as follows.

In the limit coefficient calculation unit 40A, the sum of the current amplitude values $|I1p|$ and $|I1nf|$ of the fundamental positive-phase-sequence component and the fundamental negative-phase-sequence component is multiplied by the fundamental impedance XL of the reactor in the transformer 11, at a constant multiplier 91, thereby calculating voltage needed for outputting the current amplitude value $|I1p|$ and the current amplitude value $|I1nf|$, i.e., voltage to be allocated for the fundamental positive-phase-sequence component and the fundamental negative-phase-sequence component.

Then, the limit coefficient calculation unit 40A subtracts the voltage to be allocated for the fundamental positive-phase-sequence component and the fundamental negative-phase-sequence component from the voltage Vhmax, thereby calculating a voltage upper limit value Vhh for the frequency component group of which the priorities are at the second rank or below. Then, the voltage upper limit value Vhh is divided by the fundamental impedance XL at a divider 92, thereby calculating a current limitation value 92*a* based on the voltage upper limit value Vhh.

In addition, regarding the current amplitude values $|I5pf|$, $|I5nf|$, ..., $|Ikpf|$, and $|Iknf|$ other than the fundamental positive-phase-sequence component and the fundamental negative-phase-sequence component, an amplitude sum Ih which is the total sum of these amplitude values is calculated as the second current value, by a total sum calculator 87. Further, the current amplitude values $|I5pf|$, $|I5nf|$, ..., $|Ikpf|$, and $|Iknf|$ are multiplied by constants corresponding to the respective order numbers at constant multipliers 88, and the total sum thereof is calculated as a third current value Iha by a total sum calculator 89. The third current value Iha is the total sum of the current amplitude values imparted with weights based on the respective frequencies.

Then, a value 90*a* obtained by dividing the amplitude sum Ih (second current value) by the third current value Iha at a divider 90 is multiplied by the current limitation value 92*a* based on the voltage upper limit value Vhh at a multiplier 93, thereby calculating a first current value Ihha which is a current limitation value based on the voltage upper limit value Vhh for the frequency component group of which the priorities are at the second rank or below.

In addition, in the limit coefficient calculation unit 40A, the current amplitude values $|I1p|$ and $|I1nf|$ which are currents to be respectively allocated for the fundamental positive-phase-sequence component and the fundamental negative-phase-sequence component are sequentially subtracted from the maximum current Imax that the power converter 10 can output, thereby calculating a current upper limit value Ihh for the frequency component group of which the priorities are at the second rank or below.

The calculated first current value Ihha, the calculated current upper limit value Ihh, and the calculated amplitude sum Ih (second current value) are inputted to a minimum value extractor 94, and the minimum value extractor 94 extracts the minimum value among the three current values. This minimum value is divided by the amplitude sum Ih at a divider 95, thereby calculating the limit coefficient Kh which is the ratio of the minimum value to the amplitude sum Ih.

The compensation current desired values 32 for the respective frequency components are multiplied by the limit coefficients K (K1$n$, Kh) generated as described above, that is, the compensation current desired values 32 are corrected using the limit coefficients K, whereby the compensation current commands 31 are generated.

Also in the present embodiment, as in the above embodiment 1, while sufficient usage of the voltage and the current that the power converter 10 can output is promoted, the limit coefficient can be calculated in accordance with each order number of the compensation current, and thus it is possible to effectively perform harmonic compensation for each harmonic order. In addition, the limit coefficients K can be calculated in real time in accordance with the operation condition of the power conversion device 100 and thus it is possible to perform control with high reliability and high accuracy.

In addition, in the present embodiment, for the plurality of frequency components of which the priorities are at the second rank or below, the compensation current commands 31 can be generated using the same limit coefficient K without particularly setting different priorities.

Further, for example, in a case of desiring to preferentially compensate for a specific frequency component because of resonance of a transmission line or the like, the priority for that frequency component may be set at the first rank, and priorities for the other frequency components may be set at the same rank, whereby it is possible to effectively perform harmonic compensation so as to specialize in the specific frequency component.

In the above embodiment, priorities of harmonic compensation for the frequency components at the second rank or below are all set at the same rank. However, by combining the method of the above embodiment 1, the same ranks of priorities may be set for a plurality of frequency component groups and thus a total of three or more different limit coefficients K may be generated to generate the compensation current commands 31, whereby control with a high degree of freedom can be realized.

Embodiment 3

In the above embodiments 1 and 2, also for the frequency component of which the priority of harmonic compensation is at the first rank, the voltage upper limit value Vh1 and the current upper limit values Ih1, Ih1c are calculated and the limit coefficient K1n is calculated.

Figure 16:
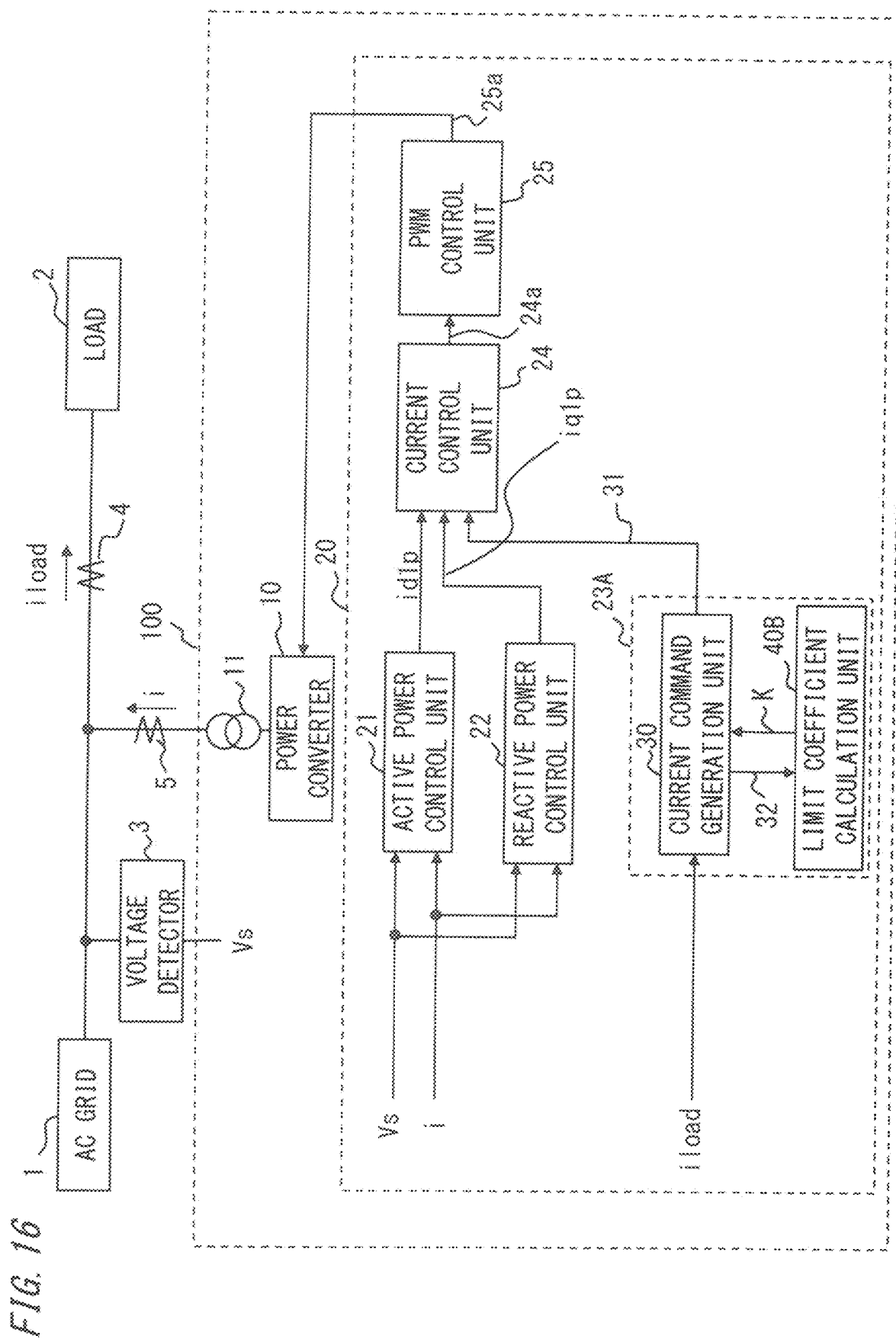
FIG. 16 is a block diagram showing a schematic configuration of a power conversion device according to embodiment 3.

However, the present disclosure is not limited thereto. FIG. 16 is a block diagram showing a schematic configuration of a power conversion device according to embodiment 3.

As in the above embodiment 1, the power conversion device 100 includes the power converter 10 and the control circuit 20, and the control circuit 20 performs switching control of switching elements in the power converter 10 on the basis of input information (interconnection point voltage Vs, load current iload, output current i) from the voltage detector 3 and the current detectors 4, 5, thereby performing output control of the power converter 10.

The control circuit 20 includes the active power control unit 21, the reactive power control unit 22, a harmonic compensation unit 23A, the current control unit 24, and the PWM control unit 25. The harmonic compensation unit 23A includes the current command generation unit 30 and a limit coefficient calculation unit 40B, and generates the compensation current commands 31 for compensating for harmonic currents by compensation currents.

In embodiment 3, the active current command id1p and the reactive current command iq1p from the active power control unit 21 and the reactive power control unit 22 are inputted only to the current control unit 24. The limit coefficient calculation unit 40B receives the compensation current desired values 32 from the current command generation unit 30, and generates the limit coefficient K for each frequency component on the basis of the compensation current desired values 32. The other configurations are the same as those in the above embodiment 1 shown in FIG. 1.

Figure 17:
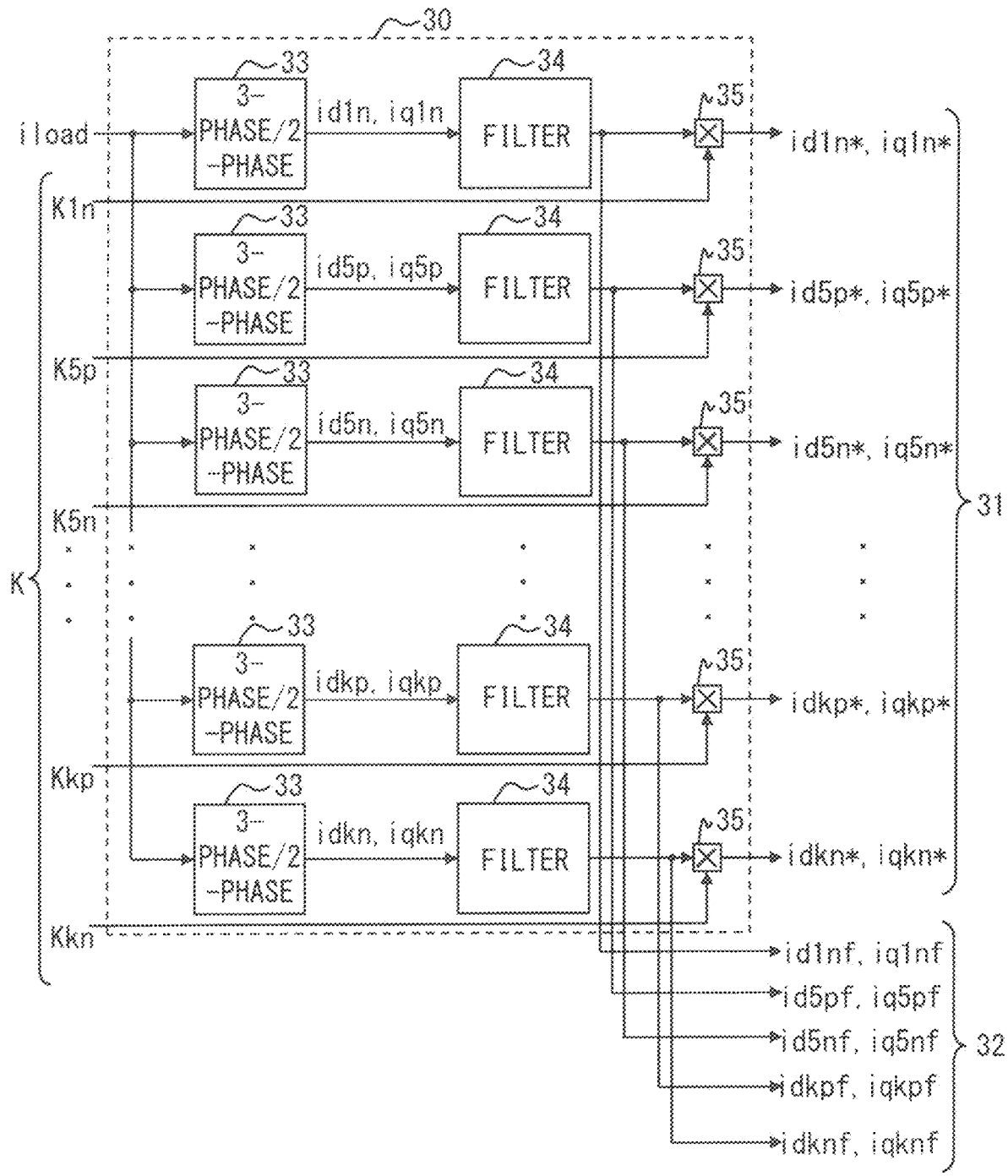
FIG. 17 shows a configuration of a current command generation unit of the power conversion device according to embodiment 3.

FIG. 17 shows a configuration of the current command generation unit 30 of the harmonic compensation unit 23A. The current command generation unit 30 is the same as that in the above embodiment 1 shown in FIG. 8, and operates in the same manner to generate the compensation current desired value 32 and generate the compensation current command 31, for each frequency component.

Figure 18:
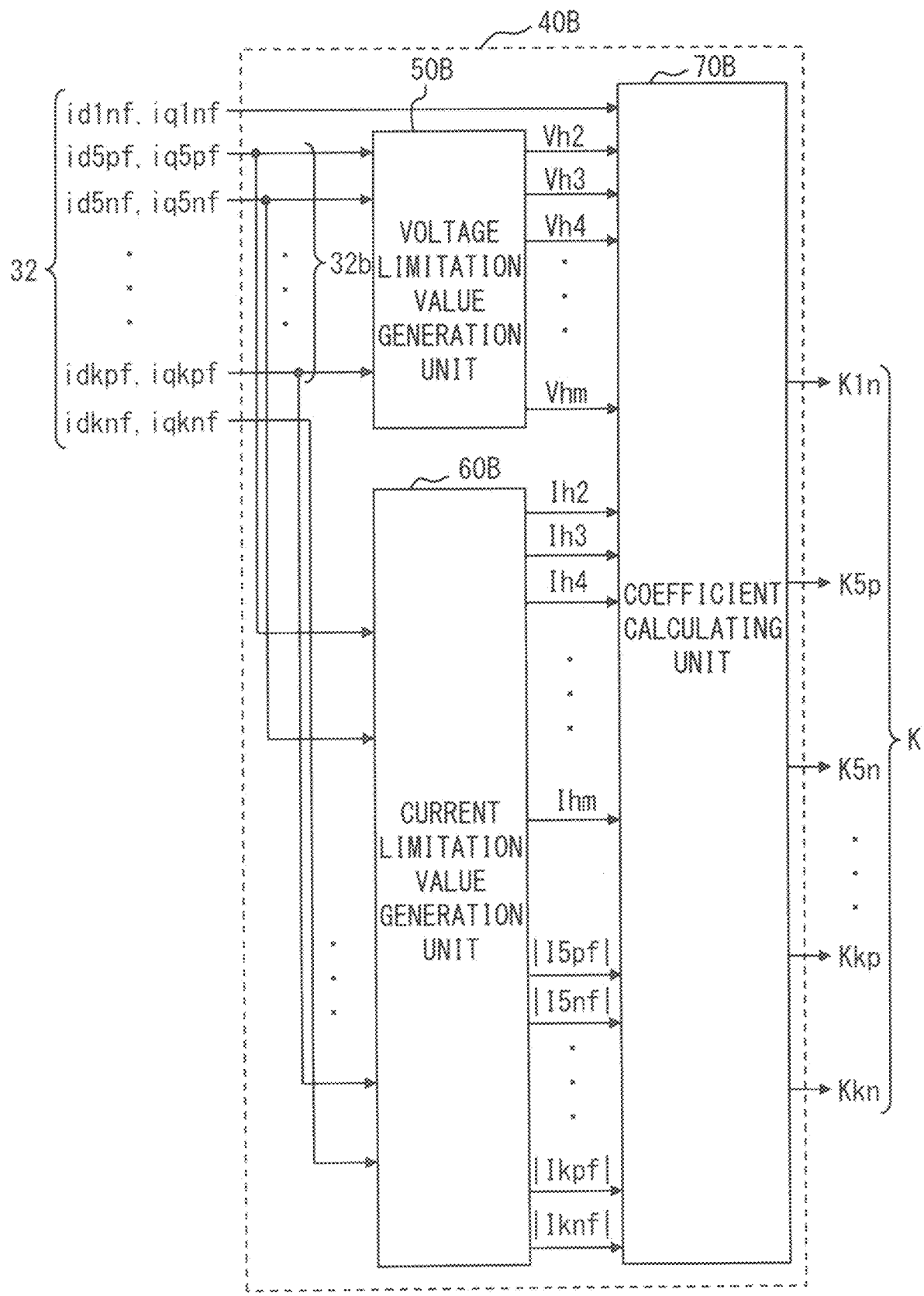
FIG. 18 shows a configuration of a limit coefficient calculation unit of the power conversion device according to embodiment 3.

FIG. 18 shows a configuration of the limit coefficient calculation unit 40B of the harmonic compensation unit 23A.

The limit coefficient calculation unit 40B includes a voltage limitation value generation unit 50B, a current limitation value generation unit 60B, and a coefficient calculating unit 70B. The limit coefficient calculation unit 40B receives the compensation current desired values 32 from the current command generation unit 30, and generates the limit coefficient K (K1n, K5p, K5n, ..., Kkp, and Kkn) for each frequency component.

Figure 19:
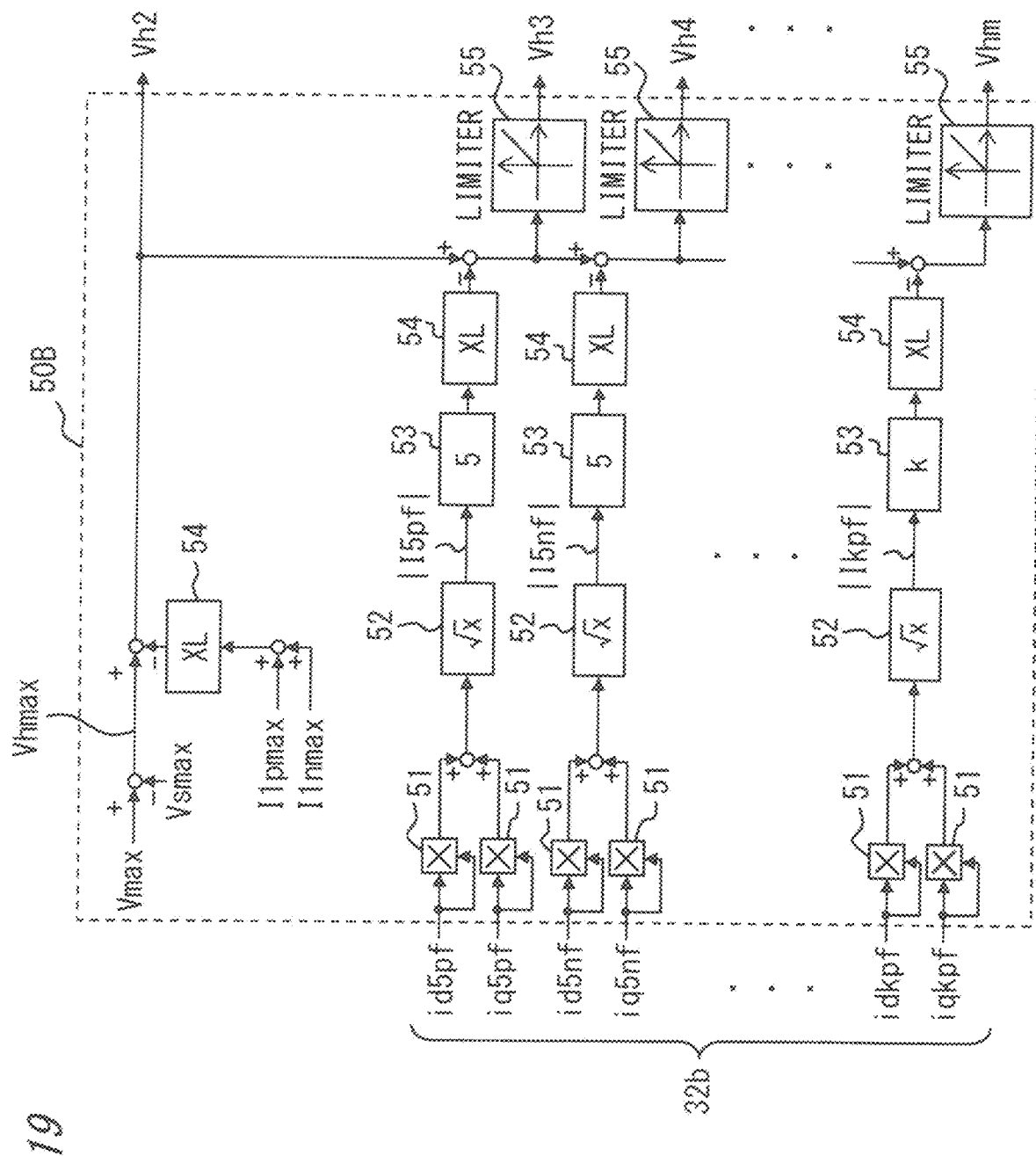
FIG. 19 shows a configuration of a voltage limitation value generation unit in the limit coefficient calculation unit according to embodiment 3.
Figure 20:
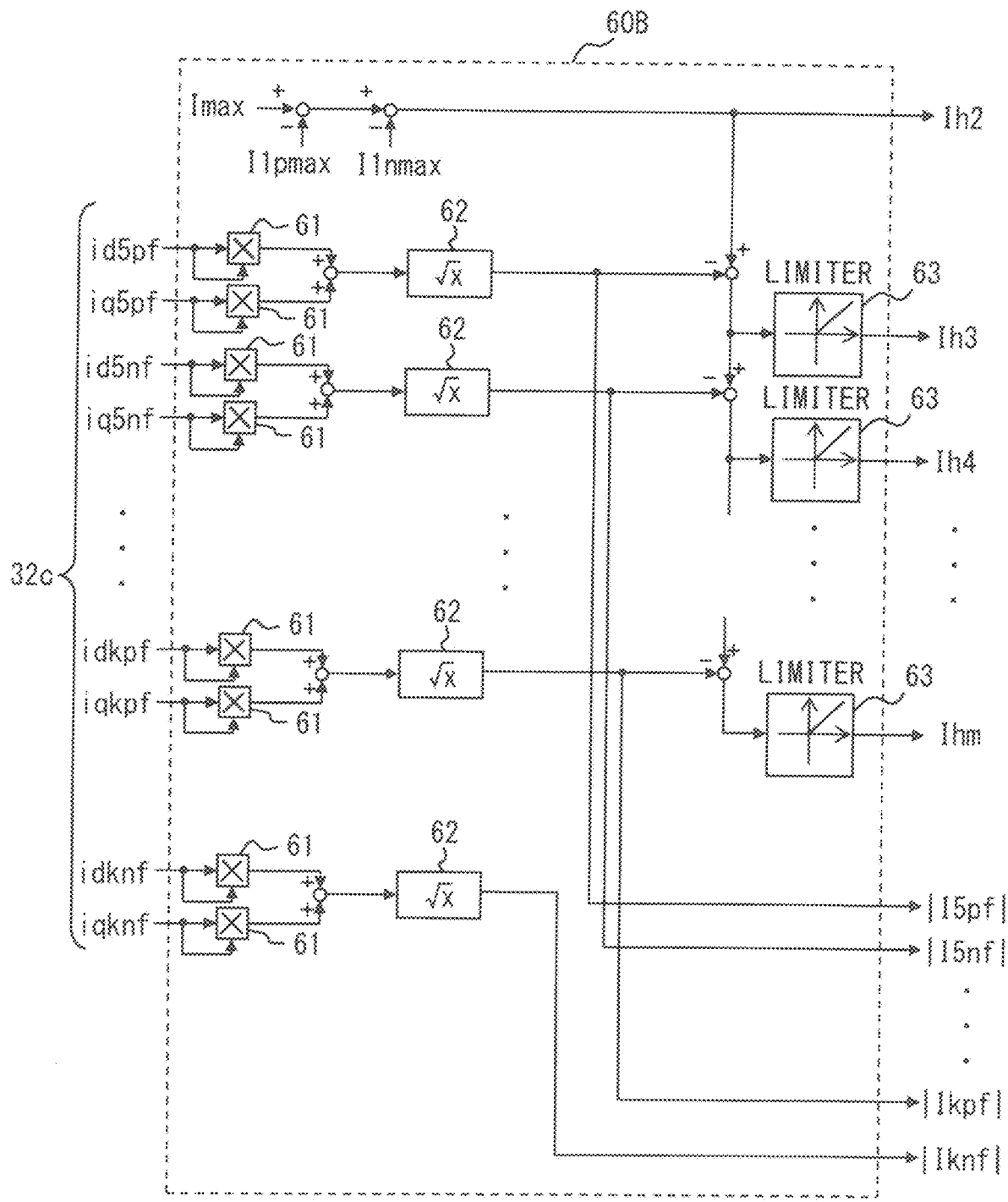
FIG. 20 shows a configuration of a current limitation value generation unit in the limit coefficient calculation unit according to embodiment 3.
Figure 21:
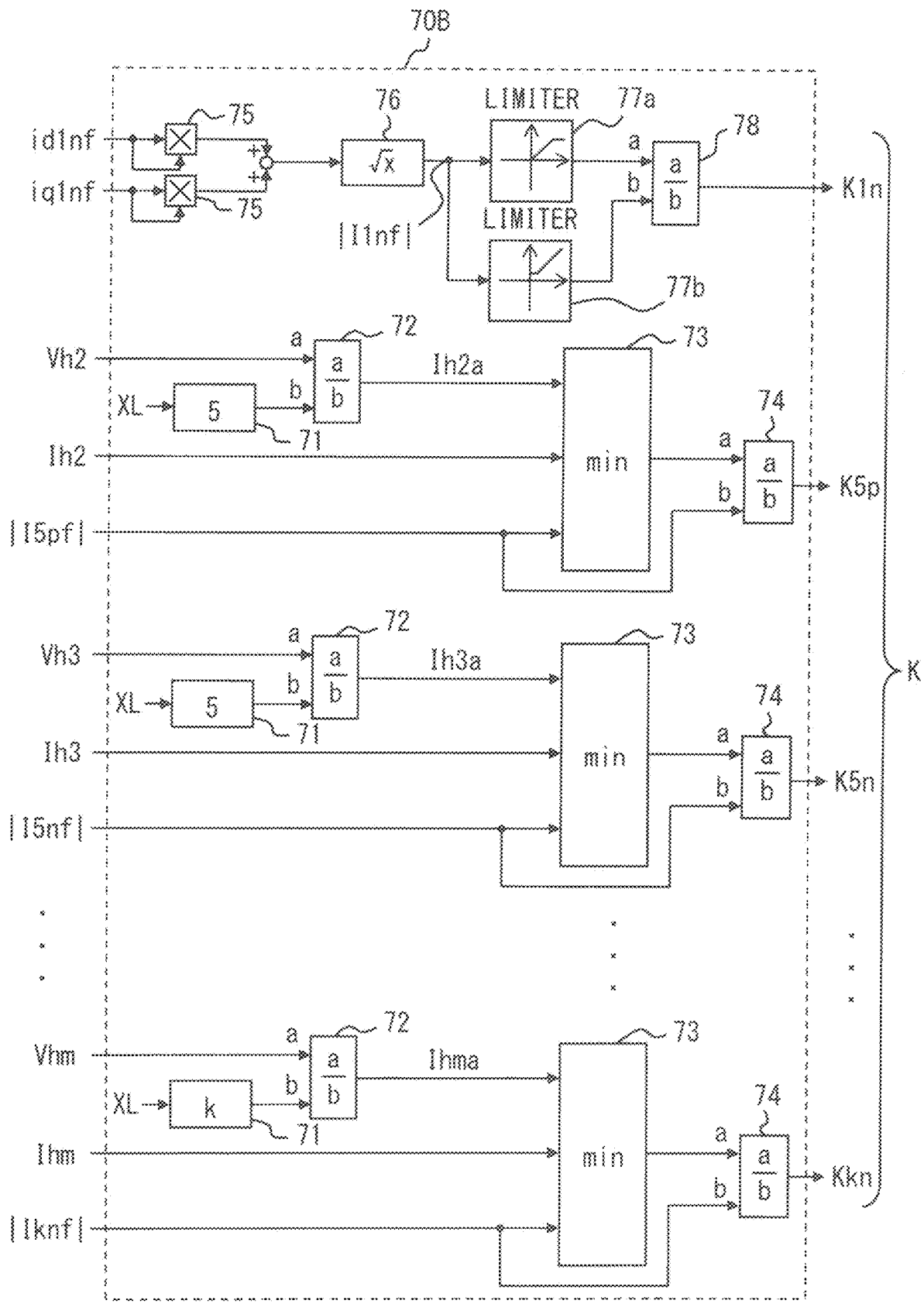
FIG. 21 shows a configuration of a coefficient calculating unit in the limit coefficient calculation unit according to embodiment 3.

FIG. 19 shows a configuration of the voltage limitation value generation unit 50B in the limit coefficient calculation unit 40B, and FIG. 20 shows a configuration of the current limitation value generation unit 60B in the limit coefficient calculation unit 40B. FIG. 21 shows a configuration of the coefficient calculating unit 70B in the limit coefficient calculation unit 40.

Regarding harmonics to be compensated for by the harmonic compensation unit 23A, a priority of harmonic compensation is set for each of the plurality of frequency components, and in this case, the priority for the fundamental negative-phase-sequence component is set at the first rank. In the limit coefficient calculation unit 40B, the voltage limitation value generation unit 50B and the current limitation value generation unit 60B generate the voltage upper limit values Vh2 to Vhm and the current upper limit values Ih2 to Ihm for the respective frequency components, in a descending order of priorities from the second rank.

As shown in FIG. 18 and FIG. 19, the voltage limitation value generation unit 50B receives compensation current desired values 32b ((id5pf, iq5pf), (id5nf, iq5nf), ..., (idkpf, iqkpf)) excluding the fundamental negative-phase-sequence component of which the priority is at the first rank and the kth-order negative-phase-sequence component having the lowest priority among the compensation current desired values 32 from the current command generation unit 30.

In the voltage limitation value generation unit 50B, the received d-axis and q-axis currents of each frequency component are squared by the multipliers 51, and a square root of a sum obtained by adding the squared values is calculated by the square root calculator 52, thereby generating the current amplitude values |I5pf|, |I5nf|, ..., |Ikpf|. Then, at the constant multipliers 53, 54, each current amplitude value is multiplied by a constant corresponding to the order number of the current and the fundamental impedance XL of the reactor in the transformer 11, thereby calculating voltage needed for outputting each current amplitude value, i.e., voltage to be allocated for each frequency component.

In addition, in the voltage limitation value generation unit 50B, the grid voltage maximum value Vsmax is subtracted from the maximum voltage Vmax that the power converter 10 can output, thereby calculating the voltage Vhmax that can be used for control of the power converter 10. Then, the sum of a current maximum value I1pmax of the fundamental positive-phase-sequence component and a current maximum value I1nmax of the fundamental negative-phase-sequence component is multiplied by the fundamental impedance XL of the reactor in the transformer 11, at the constant multiplier 54, thereby calculating voltage for the fundamental positive-phase-sequence component and the fundamental negative-phase-sequence component. The calculated voltage is subtracted from the voltage Vhmax, thereby calculating the voltage upper limit value Vh2 for the frequency component for which harmonic compensation is performed with the priority set at the second rank, in this case, the fifth-order positive-phase-sequence component.

Further, the voltage limitation value generation unit 50B subtracts the voltage to be allocated for the fifth-order positive-phase-sequence component from the voltage upper limit value Vh2 for the fifth-order positive-phase-sequence component, and then performs limiter processing for making a negative value be zero by the limiter 55, thereby calculating the voltage upper limit value Vh3 for the frequency component for which harmonic compensation is performed with the priority set at the third rank, in this case, the fifth-order negative-phase-sequence component. Similarly, for each frequency component that is the compensation target, voltage to be allocated for the frequency component is calculated, and this voltage is subtracted from the voltage upper limit value before limiter processing, to calculate the voltage upper limit value for the frequency component of which the priority is at the next rank.

Thus, the voltage upper limit values Vh2, Vh3, Vh4, ..., Vhm are generated in the order of priorities from the second rank. The generated voltage upper limit values are inputted to the coefficient calculating unit 70B.

In a case where the voltage value inputted to the limiter 55 is a negative value, the output voltage of the power converter 10 has already exceeded the usable voltage, and therefore the voltage value is made to be zero by limiter processing and calculation of voltage upper limit values is not performed for the subsequent frequency components.

As shown in FIG. 18 and FIG. 20, the current limitation value generation unit 60B receives compensation current desired values 32c ((id5pf, iq5pf), (id5nf, iq5nf), ..., (idkpf, iqkpf), and (idknf, iqknf)) excluding the fundamental negative-phase-sequence component of which the priority is at the first rank among the compensation current desired values 32 from the current command generation unit 30.

In the current limitation value generation unit 60B, the received d-axis and q-axis currents of each frequency component are squared by the multipliers 61, and a square root of a sum obtained by adding the squared values is calculated by the square root calculator 62, thereby generating the current amplitude values |I5pf|, |I5nf|, ..., |Ikpf|, and |Iknf|. The current amplitude values are currents to be allocated for the respective frequency components, in this case, the frequency components of which the priorities are at the second rank or below.

Further, the current limitation value generation unit 60B subtracts the current maximum value I1pmax of the fundamental positive-phase-sequence component and the current maximum value I1nmax of the fundamental negative-phase-sequence component from the maximum current Imax that the power converter 10 can output, thereby calculating the current upper limit value Ih2 for the frequency component for which harmonic compensation is performed with the priority set at the second rank, in this case, the fifth-order positive-phase-sequence component.

Then, from the current upper limit value Ih2, the current amplitude value |I5pf| which is the current to be allocated for the fifth-order positive-phase-sequence component is subtracted, and the resultant value is subjected to limiter processing for making a negative value be zero by the limiter 55, thereby calculating the current upper limit value Ih3 for the frequency component of which the priority is at the third rank, in this case, the fifth-order negative-phase-sequence component.

Similarly, for each frequency component that is the compensation target, the current (current amplitude value) to be allocated for the frequency component is calculated, and this current is subtracted from the current upper limit value before limiter processing, to calculate the current upper limit value for the frequency component of which the priority is at the next rank.

Thus, for the respective frequency components that are the compensation targets, the current limitation value generation unit 60B generates the current upper limit values Ih2, Ih3, Ih4, ..., Ihm in the order of priorities from the second rank. Then, the generated current upper limit values Ih2, Ih3, Ih4, ..., Ihm and the current amplitude values |I5pf|, |I5nf|, ..., |Ikpf|, |Iknf| as second current values are outputted from the current limitation value generation unit 60B and inputted to the coefficient calculating unit 70B.

In a case where the current value inputted to the limiter 63 is a negative value, the output current of the power converter 10 has already exceeded the usable current, and therefore the current value is made to be zero by limiter processing and calculation of current upper limit values is not performed for the subsequent frequency components. For the kth-order negative-phase-sequence component having the lowest priority, limiter processing is not performed after the current amplitude value |Iknf| is calculated, and only the current amplitude value |Iknf| is outputted.

As shown in FIG. 18 and FIG. 21, the coefficient calculating unit 70B receives the fundamental negative-phase-sequence component (id1nf, iq1nf) of which the priority is at the first rank among the compensation current desired values 32 from the current command generation unit 30, and further receives the voltage upper limit values Vh2, Vh3, Vh4, ..., Vhm, the current upper limit values Ih2, Ih3, Ih4, ..., Ihm, and the current amplitude values |I5pf|, |I5nf|, ..., |Ikpf|, and |Iknf| generated for the respective frequency components of which the priorities are at the second rank or below.

In the coefficient calculating unit 70B, the d-axis and q-axis currents for the fundamental negative-phase-sequence component (id1nf, iq1nf) of which the priority is at the first rank are squared by multipliers 75, and a square root of a sum obtained by adding the squared values is calculated by a square root calculator 76, thereby calculating the current amplitude value |I1nf|. Then, the current amplitude value |I1nf| is subjected to limiter processing with a predetermined limitation value, e.g., I1nmax, by a limiter 77a, and also subjected to limiter processing for avoiding zero by a limiter 77b, and the output of the limiter 77a is divided by the output of the limiter 77b, at a divider 78. Thus, the limit coefficient K1n for the fundamental negative-phase-sequence component is generated.

In addition, for each frequency component of which the priorities are at the second rank or below, the coefficient calculating unit 70B calculates the limit coefficient using the voltage upper limit value, the current upper limit value, and the current amplitude value, as in the above embodiment 1. For example, for the fifth-order positive-phase-sequence component, the fundamental impedance XL of the reactor in the transformer 11 is multiplied by a constant corresponding to the order number (in this case, 5) at the constant multiplier 71, thereby calculating an impedance corresponding to the order number. Then, the voltage upper limit value Vh2 is divided by the calculated impedance at the divider 72, thereby calculating the first current value Ih2a which is the current limitation value based on the voltage upper limit value Vh2.

The calculated first current value Ih2a, the calculated current upper limit value Ih2, and the calculated current amplitude value |I5pf| are inputted to the minimum value extractor 73, and the minimum value extractor 73 extracts the minimum value among the three current values. This minimum value is divided by the current amplitude value |I5pf| at the divider 74, thereby calculating the limit coefficient K5p which is the ratio of the minimum value to the current amplitude value |I5pf|.

Similarly, also regarding the other frequency components of which the priorities are at the second rank or below, minimum values are extracted among the first current values Ih3a, ..., Ihma calculated from the voltage upper limit values Vh3, ..., Vhm and the impedances XL based on the frequencies, the current upper limit values Ih3, . . . , Ihm, and the current amplitude values |I5nf|, . . . , |Iknf| for the respective frequency components, and the minimum values are divided by the current amplitude values |I5nf|, . . . , |Iknf|, thereby calculating the limit coefficients K5n, . . . , Kkn.

The compensation current desired values 32 for the respective frequency components are multiplied by the limit coefficients K (K1n, K5p, . . . , Kkn) generated as described above, that is, the compensation current desired values 32 are corrected using the limit coefficients K, whereby the compensation current commands 31 are generated.

Also in the present embodiment, as in the above embodiment 1, while sufficient usage of the voltage and the current that the power converter 10 can output is promoted, the limit coefficient can be calculated in accordance with each order number of the compensation current, and thus it is possible to effectively perform harmonic compensation for each harmonic order. In addition, the limit coefficient K can be calculated in real time in accordance with the operation condition of the power conversion device 100 and thus it is possible to perform control with high reliability and high accuracy.

In a case of desiring to preferentially compensate for a specific frequency component, the limit coefficient (K1n) for individually compensating for that frequency component may be generated, and priorities may be set for the other frequency components, to generate the limit coefficients K5p, . . . , Kkn using the voltage upper limit values and the current upper limit values as in the above embodiment 1. Thus, it is possible to perform harmonic compensation so as to specialize in the specific frequency component, and also for the other frequency components, it is possible to accurately perform harmonic control in accordance with priorities.

Embodiment 4

In the above embodiment 3, different limit coefficients K are calculated for the frequency components of which the priorities are at the second rank or below. However, as in the above embodiment 2, for the frequency components of which the priorities are at the second rank or below, the priorities may be set at the same rank and thus an equal limit coefficient K may be calculated.

As in embodiment 3 shown in FIG. 16, the power conversion device 100 includes the power converter 10 and the control circuit 20, and the control circuit 20 performs switching control of switching elements in the power converter 10 on the basis of input information (interconnection point voltage Vs, load current iload, output current i) from the voltage detector 3 and the current detectors 4, 5, thereby performing output control of the power converter 10.

The control circuit 20 includes the active power control unit 21, the reactive power control unit 22, the harmonic compensation unit 23A, the current control unit 24, and the PWM control unit 25. The harmonic compensation unit 23A includes the current command generation unit 30A and a limit coefficient calculation unit 40C, and generates the compensation current commands 31 for compensating for harmonic currents by compensation currents.

In embodiment 4, as in the above embodiment 3, the active current command id1p and the reactive current command iq1p from the active power control unit 21 and the reactive power control unit 22 are inputted only to the current control unit 24. The limit coefficient calculation unit 40C receives the compensation current desired values 32 from the current command generation unit 30A, and generates the limit coefficient K for each frequency component on the basis of the compensation current desired values 32. The other configurations are the same as those in the above embodiment 1.

As in the above embodiment 1, the harmonic compensation unit 23A includes the current command generation unit 30A and the limit coefficient calculation unit 40C, and generates the compensation current commands 31 for compensating for harmonic currents by compensation currents. In embodiment 4, a priority of harmonic compensation for the fundamental negative-phase-sequence component is set at the first rank, and priorities for the other components are all set at the same rank.

The current command generation unit 30A receives the value of the load current iload from the current detector 4 and the limit coefficient K generated for each frequency component by the limit coefficient calculation unit 40C. Then, the current command generation unit 30A generates the compensation current desired value 32 for each of the plurality of frequency components on the basis of the load current iload, and corrects the compensation current desired value 32 using the limit coefficient K, to generate the compensation current command 31.

Figure 22:
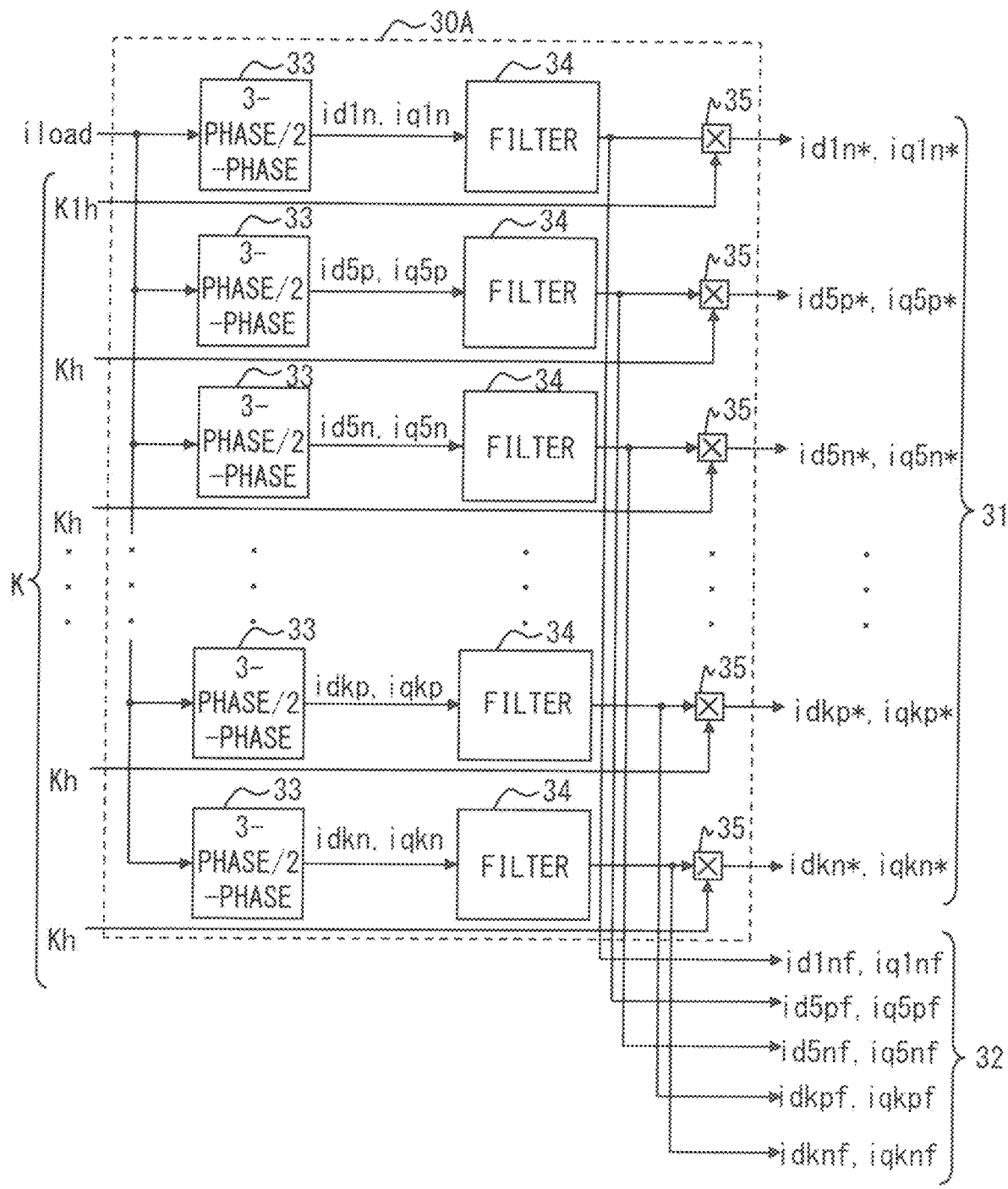
FIG. 22 shows a configuration of a current command generation unit of a power conversion device according to embodiment 4.
Figure 23:
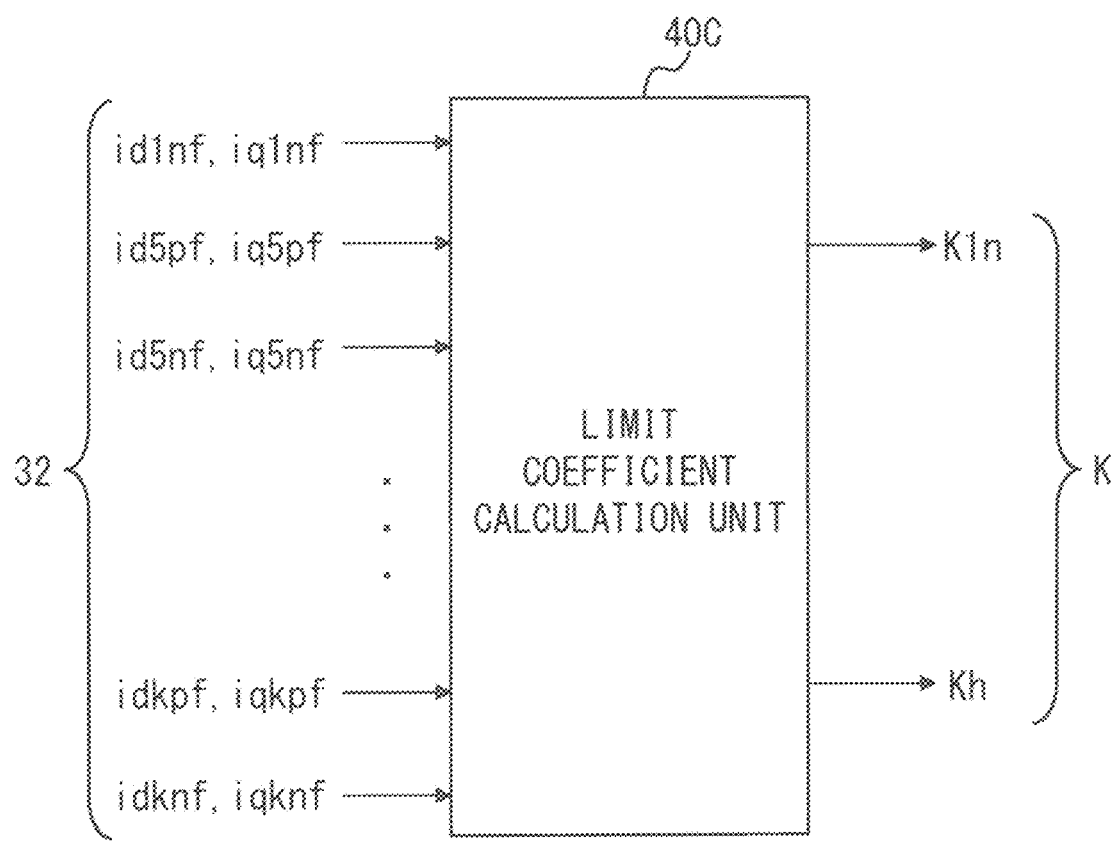
FIG. 23 shows a schematic configuration of a limit coefficient calculation unit of a power conversion device according to embodiment 4.

FIG. 22 shows a configuration of the current command generation unit 30A of the harmonic compensation unit 23A, and FIG. 23 shows a configuration of the limit coefficient calculation unit 40C of the harmonic compensation unit 23A.

The current command generation unit 30A is the same as that in the above embodiment 2 shown in FIG. 13, and operates in the same manner to generate the compensation current desired value 32 and generate the compensation current command 31, for each frequency component. Then, at the multiplier 35, the compensation current desired value 32 for each frequency component is multiplied by the limit coefficient K (K1n, Kh) generated for each frequency component by the limit coefficient calculation unit 40C. Thus, for the respective frequency components, the compensation current commands 31, i.e., (id1n*, iq1n*), (id5p*, iq5p*), (id5n*, iq5n*), . . . , (idkp*, iqkp*), and (idkn*, iqkn*) are generated. In this case, the limit coefficients K (K1n, Kh) generated for the respective frequency components are the same except for the fundamental negative-phase-sequence component, and therefore two kinds of limit coefficients are used.

Figure 24:
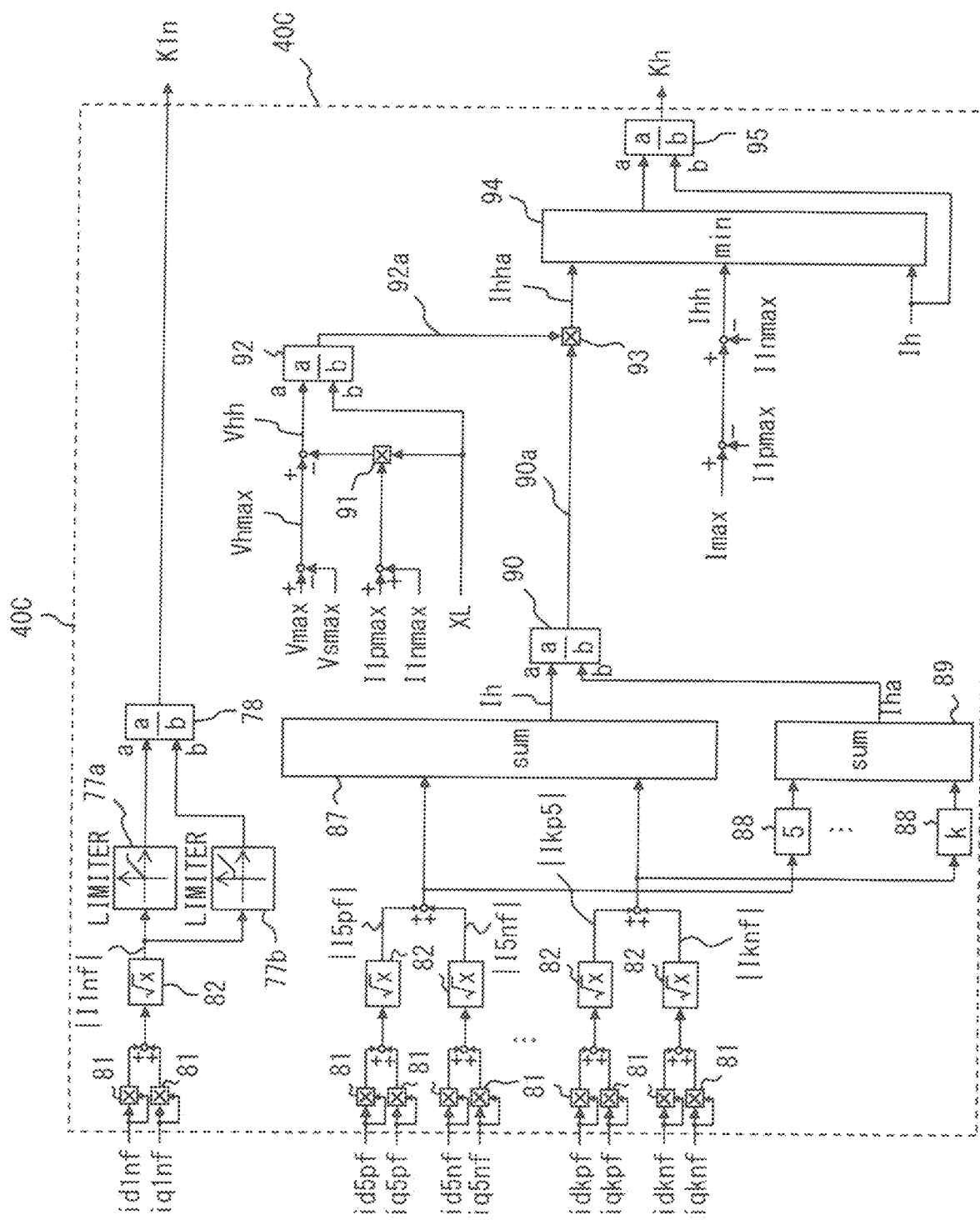
FIG. 24 shows a detailed configuration of the limit coefficient calculation unit of the power conversion device according to embodiment 4.

FIG. 24 shows a detailed configuration of the limit coefficient calculation unit 40C.

As shown in FIG. 24, the limit coefficient calculation unit 40C receives the compensation current desired values 32 ((id1nf, iq1nf), (id5pf, iq5pf), (id5nf, iq5nf), . . . , (idkpf, iqkpf), and (idknf, iqknf)) from the current command generation unit 30A.

In the limit coefficient calculation unit 40C, the received d-axis and q-axis currents of each frequency component are squared by the multipliers 81, and a square root of a sum obtained by adding the squared values is calculated by the square root calculator 82, thereby generating the current amplitude values |I1nf|, |I5pf|, |I5nf|, . . . , |Ikpf|, and |Iknf|.

In addition, the limit coefficient calculation unit 40C generates the limit coefficient K1n for the fundamental negative-phase-sequence component, in the same manner as in the above embodiment 3. That is, the current amplitude value |I1nf| is subjected to limiter processing with a predetermined limitation value, e.g., I1nmax, by the limiter 77a, and also subjected to limiter processing for avoiding zero by the limiter 77b, and the output of the limiter 77a is divided by the output of the limiter 77b, at the divider 78. Thus, the limit coefficient K1n for the fundamental negative-phase-sequence component is generated.

The limit coefficient Kh for the frequency component group of which the priorities are at the second rank or below is calculated as follows.

The limit coefficient calculation unit 40C subtracts the grid voltage maximum value Vsmax from the maximum voltage Vmax that the power converter 10 can output, thereby calculating voltage Vhmax that can be used for control of the power converter 10. Then, the sum of the current maximum value I1$p$max of the fundamental positive-phase-sequence component and the current maximum value I1$n$max of the fundamental negative-phase-sequence component is multiplied by the fundamental impedance XL of the reactor in the transformer 11, at the constant multiplier 91, thereby calculating voltage for the fundamental positive-phase-sequence component and the fundamental negative-phase-sequence component. The calculated voltage is subtracted from the voltage Vhmax, thereby calculating the voltage upper limit value Vhh for the frequency component group of which the priorities are at the second rank or below. Then, the voltage upper limit value Vhh is divided by the fundamental impedance XL at the divider 92, thereby calculating the current limitation value 92a based on the voltage upper limit value Vhh.

In addition, regarding the current amplitude values |I5$pf$|, |I5$nf$|, ..., |Ikpf|, and |Iknf| other than the fundamental positive-phase-sequence component and the fundamental negative-phase-sequence component, the amplitude sum Ih which is the total sum of these amplitude values is calculated as the second current value at the total sum calculator 87. Further, the current amplitude values |I5$pf$|, |I5$nf$|, ..., |Ikpf|, |Iknf| are multiplied by constants corresponding to the respective order numbers at the constant multipliers 88, and the total sum thereof is calculated as the third current value Iha at the total sum calculator 89. The third current value Iha is the total sum of the current amplitude values imparted with weights based on the respective frequencies.

It is noted that, regarding frequency components for each order, a positive-phase-sequence component and a negative-phase-sequence component are present, and therefore the case where the sum of the positive-phase-sequence component and the negative-phase-sequence component for the same order is calculated and then the total sum thereof is calculated, has been shown.

Then, the value 90a obtained by dividing the amplitude sum Ih (second current value) by the third current value Iha at the divider 90 is multiplied by the current limitation value 92a based on the voltage upper limit value Vhh at the multiplier 93, thereby calculating the first current value Ihha which is the current limitation value based on the voltage upper limit value Vhh for the frequency component group of which the priorities are at the second rank or below.

In addition, in the limit coefficient calculation unit 40C, the current maximum value I1$p$max of the fundamental positive-phase-sequence component and the current maximum value I1$n$max of the fundamental negative-phase-sequence component are sequentially subtracted from the maximum current Imax that the power converter 10 can output, thereby calculating the current upper limit value Ihh for the frequency component group of which the priorities are at the second rank or below.

The calculated first current value Ihha, the calculated current upper limit value Ihh, and the calculated amplitude sum Ih (second current value) are inputted to the minimum value extractor 94, and the minimum value extractor 94 extracts the minimum value among the three current values. This minimum value is divided by the amplitude sum Ih at the divider 95, thereby calculating the limit coefficient Kh which is the ratio of the minimum value to the amplitude sum Ih.

The compensation current desired values 32 for the respective frequency components are multiplied by the limit coefficients K (K1n, Kh) generated as described above, that is, the compensation current desired values 32 are corrected using the limit coefficients K, whereby the compensation current commands 31 are generated.

Also in the present embodiment, as in the above embodiment 1, while sufficient usage of the voltage and the current that the power converter 10 can output is promoted, the limit coefficient can be calculated in accordance with each order number of the compensation current, and thus it is possible to effectively perform harmonic compensation for each harmonic order. In addition, the limit coefficients K can be calculated in real time in accordance with the operation condition of the power conversion device 100 and thus it is possible to perform control with high reliability and high accuracy.

In addition, in the present embodiment, for the plurality of frequency components of which the priorities are at the second rank or below, the compensation current commands 31 can be generated using the same limit coefficient K without particularly setting different priorities.

In addition, since the limit coefficient (K1n) for preferentially compensating for a specific frequency component individually is generated, it is possible to perform harmonic compensation so as to specialize in the specific frequency component.

Embodiment 5

The above embodiments have shown the power conversion device in which the active current command id1$p$ and the reactive current command iq1$p$ as the first current command for the fundamental positive-phase-sequence component are generated separately from the compensation current commands 31. However, the harmonic compensation unit may generate a current command including the first current command for the fundamental positive-phase-sequence component.

Figure 25:
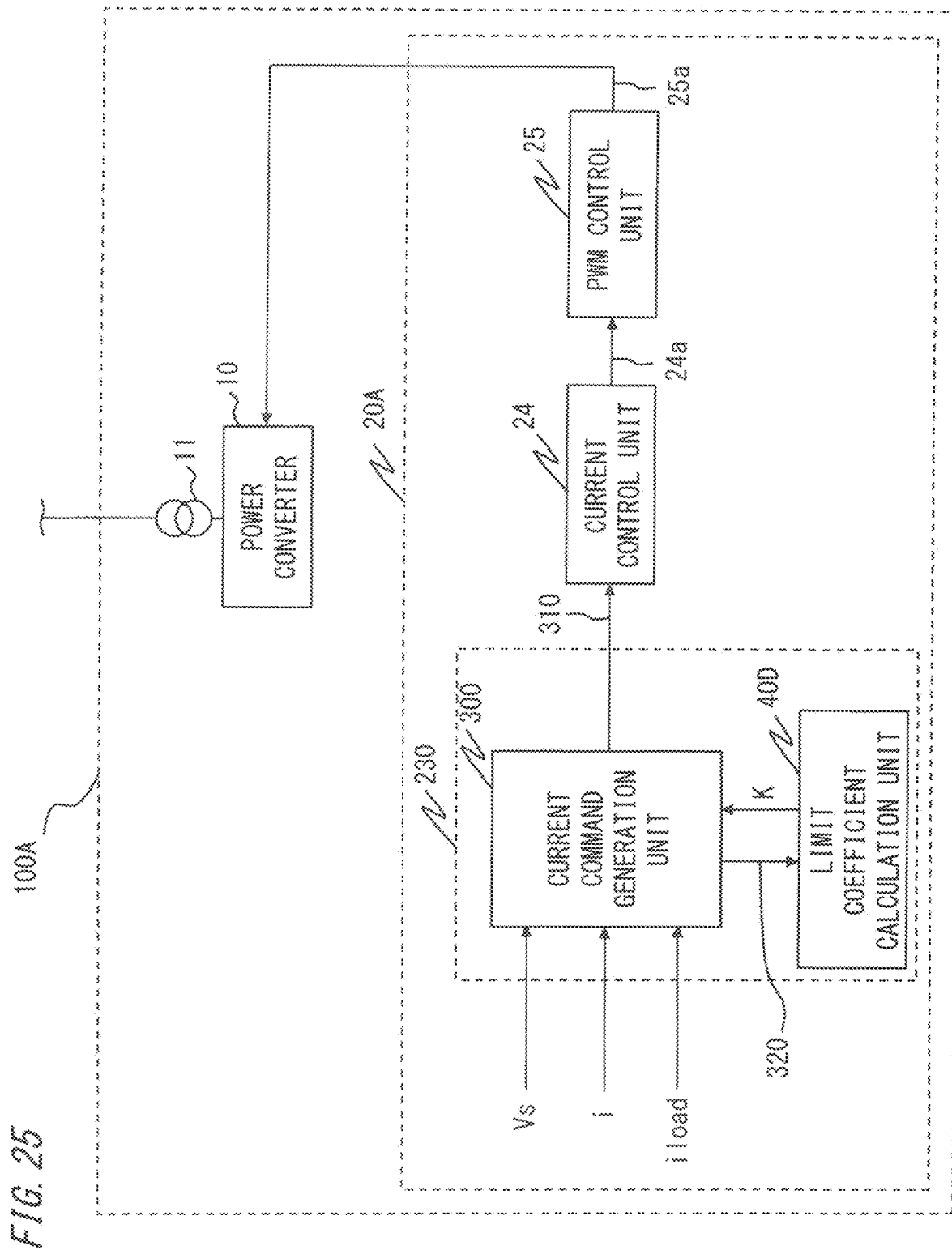
FIG. 25 is a block diagram showing a schematic configuration of a power conversion device according to embodiment 5.

FIG. 25 is a block diagram showing a schematic configuration of a power conversion device 100A according to embodiment 5. It is noted that the AC grid 1, the load 2, and the detectors 3, 4, 5 for voltage and currents are the same as those in the above embodiment 1.

As shown in FIG. 25, a control circuit 20A includes a harmonic compensation unit 230, the current control unit 24, and the PWM control unit 25.

The harmonic compensation unit 230 includes a current command generation unit 300 and a limit coefficient calculation unit 40D. The current command generation unit 300 receives the values of the interconnection point voltage Vs from the voltage detector 3, the output current i from the current detector 5, and the load current iload from the current detector 4, and the limit coefficient K generated for each frequency component by the limit coefficient calculation unit 40D. Then, the current command generation unit 300 generates a compensation current desired value 320 for each of the plurality of frequency components on the basis of the load current iload, and generates an output current command 310 including a compensation current command obtained by correcting the compensation current desired value 320 using the limit coefficient K and the first current command for the fundamental positive-phase-sequence component.

The limit coefficient calculation unit 40D receives the compensation current desired values 320 from the current command generation unit 300, and generates the limit coefficient K for each frequency component on the basis of the received values.

The configuration of the power conversion device 100A shown in FIG. 25 is applicable also to a case of outputting only harmonic compensation currents to perform harmonic compensation, as in an active filter or the like. In this case, the output current command 310 outputted from the harmonic compensation unit 230 coincides with the compensation current command.

Embodiment 6

In the above embodiments, in the case of configuring the power converter 10 as a MMC, the interphase balance in output voltages of the converter cells 12 is preferentially controlled. In the case of the MMC of the single-star-connection type as shown in FIG. 4, zero-phase-sequence voltage Vzero is outputted for control of the interphase balance in the output voltages of the converter cells 12.

In embodiment 6, a case of using the power converter 10B configured as the MMC of the single-star-connection type and outputting zero-phase-sequence voltage Vzero for interphase balance control in the power conversion device 100 of the above embodiment 1, will be described.

Figure 26:
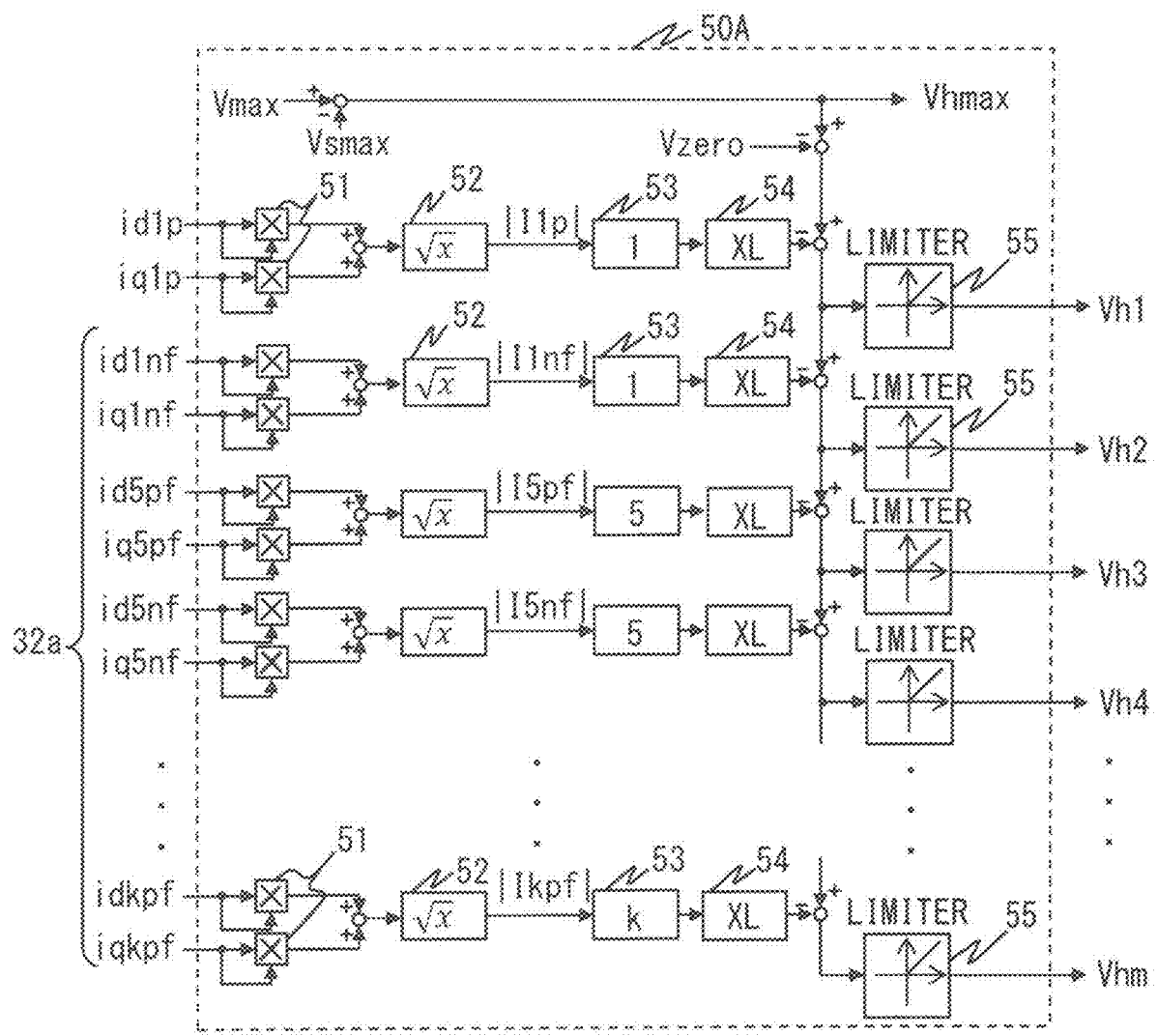
FIG. 26 shows a configuration of a voltage limitation value generation unit in a limit coefficient calculation unit according to embodiment 6.

FIG. 26 shows a configuration of a voltage limitation value generation unit in a limit coefficient calculation unit according to embodiment 6.

As shown in FIG. 26, in a voltage limitation value generation unit 50A in the limit coefficient calculation unit 40, the grid voltage maximum value Vsmax is subtracted from the maximum voltage Vmax that the power converter 10B can output, to calculate the voltage Vhmax that can be used for control of the power converter 10B, and further, the value of the zero-phase-sequence voltage Vzero is subtracted therefrom. Then, voltage to be allocated for each of the frequency components including the fundamental positive-phase-sequence component is subtracted, and as in the above embodiment 1, the voltage upper limit values Vh1, Vh2, . . . , Vhm are generated in a descending order of priorities.

The other control configurations are the same as those in the above embodiment 1.

Thus, the generated voltage upper limit values Vh1, Vh2, . . . , Vhm become voltages corrected by the zero-phase-sequence voltage Vzero. Therefore, also in the power conversion device 100 that outputs the zero-phase-sequence voltage Vzero to perform interphase balance control, the voltage and the current that the power converter 10B can output can be sufficiently used, the limit coefficient can be calculated in accordance with each order number of the compensation current, and harmonic compensation can be effectively performed for each harmonic order.

In the above description, the case of application to the above embodiment 1 has been shown. However, the above configuration is applicable also to the other embodiments, whereby the same effects are obtained.

In the above embodiment, the case of the power converter 10B configured as the MMC of the single-star-connection type has been described. Meanwhile, in a case of the power converter 10, 10A configured as the MMC of the double-star-connection type or the MMC of the delta-connection type as shown in FIG. 2 or FIG. 3, circulation current Icir is outputted for interphase balance control.

Figure 27:
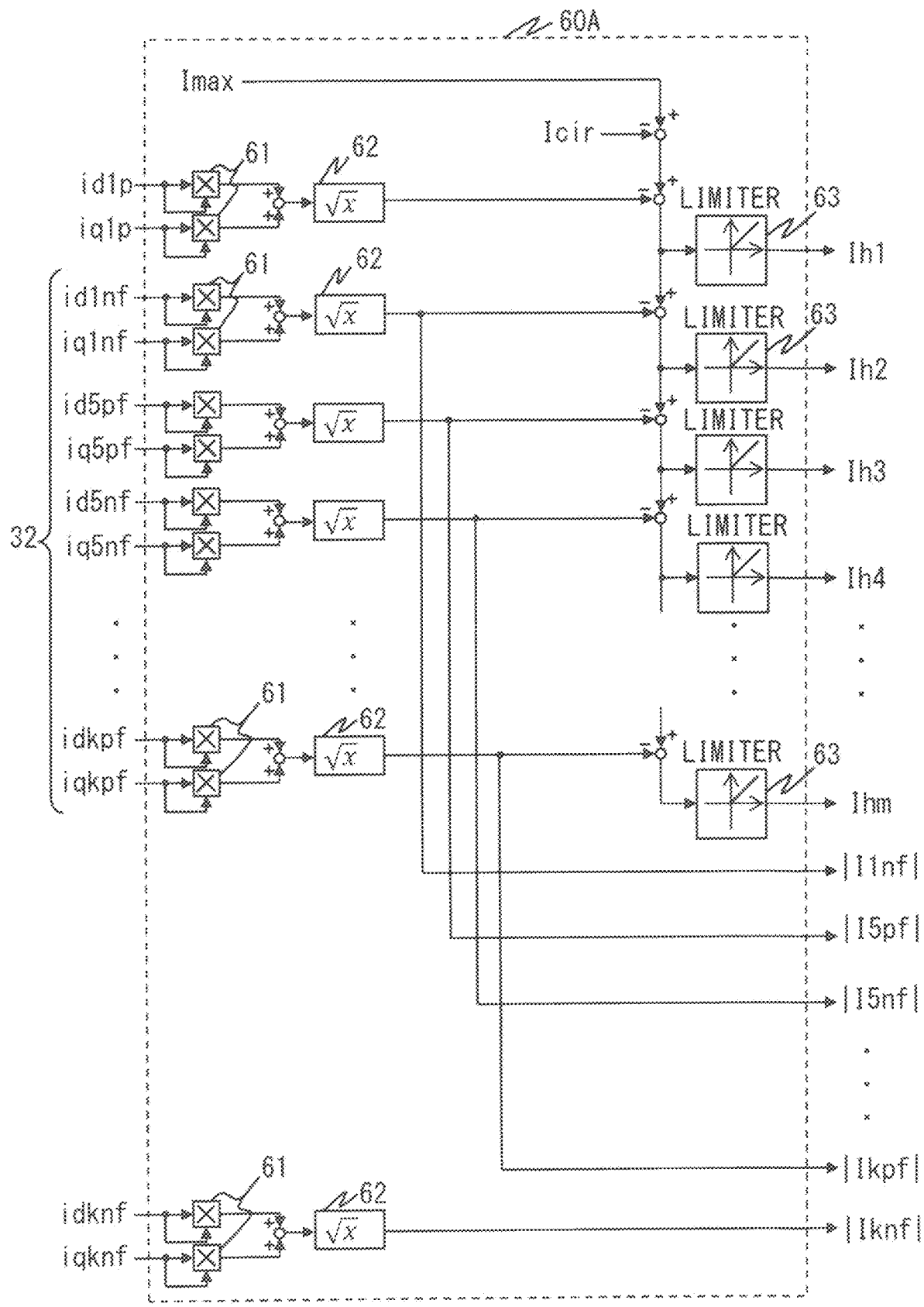
FIG. 27 shows a configuration of a current limitation value generation unit in a limit coefficient calculation unit according to another example of embodiment 6.

FIG. 27 shows a configuration of a current limitation value generation unit in a limit coefficient calculation unit according to another example of embodiment 6. In this case, in the power conversion device 100 of the above embodiment 1, the power converter 10, 10A configured as the MMC of the double-star-connection type or the delta-connection type is used, and the circulation current Icir is outputted for interphase balance control.

As shown in FIG. 27, a current limitation value generation unit 60A in the limit coefficient calculation unit 40 subtracts the value of the circulation current Icir from the maximum current Imax that the power converter 10, 10A can output. Then, current to be allocated for each of the frequency components including the fundamental positive-phase-sequence component is subtracted, and as in the above embodiment 1, the current upper limit values Ih1, Ih2, . . . , Ihm are generated in a descending order of priorities.

The other control configurations are the same as those in the above embodiment 1.

Thus, the generated current upper limit values Ih1, Ih2, . . . , Ihm become currents corrected by the circulation current Icir. Therefore, also in the power conversion device 100 that outputs the circulation current Icir to perform interphase balance control, the voltage and the current that the power converter 10, 10A can output can be sufficiently used, the limit coefficient can be calculated in accordance with each order number of the compensation current, and harmonic compensation can be effectively performed for each harmonic order.

Also in this case, the above configuration is applicable to not only the above embodiment 1 but also the other embodiments, whereby the same effects are obtained.

Embodiment 7

In the above embodiments, regarding the grid voltage maximum value Vsmax, if it is necessary to consider distortion of the grid voltage at the time of grid voltage disturbance, the grid voltage maximum value Vsmax can be generated considering voltage distortion for a desired frequency component.

Figure 28:
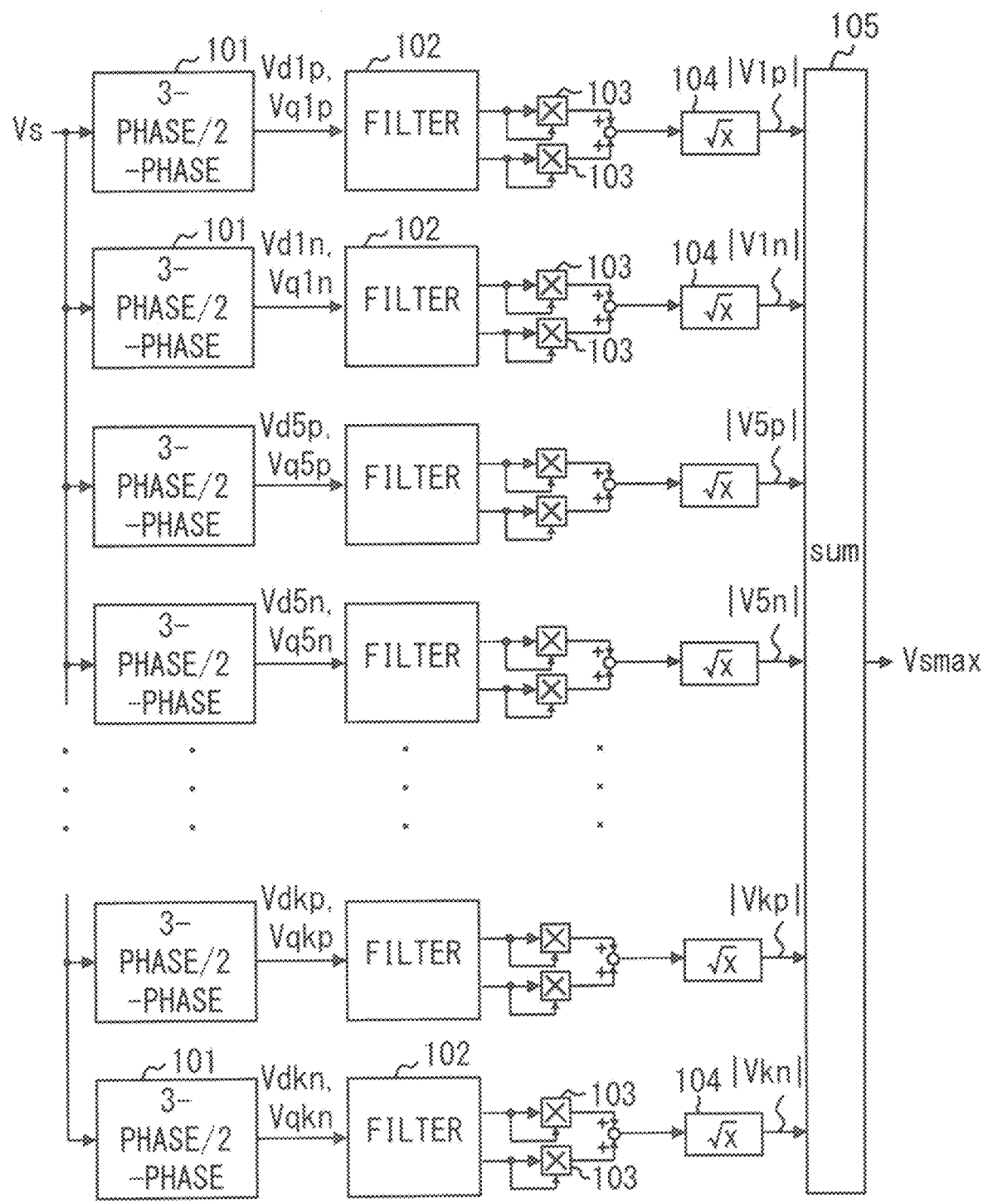
FIG. 28 shows a configuration of a circuit for calculating a voltage maximum value of an AC grid according to embodiment 7.

FIG. 28 shows a configuration of a circuit for calculating the grid voltage maximum value Vsmax which is the voltage maximum value of the AC grid 1, according to embodiment 7.

As shown in FIG. 28, the three-phase interconnection point voltages Vs are subjected to rotational coordinate conversion by each of a plurality of coordinate conversion units 101, to be converted to DC voltages for the plurality of frequency components. The plurality of coordinate conversion units 101 are set with different phases for coordinate conversion. For example, in a case of performing conversion to the dq-axis voltages Vd1p, Vq1p for the fundamental positive-phase-sequence component, coordinate conversion is performed with a positive fundamental component phase, and in a case of performing conversion to the dq-axis voltages Vd1n, Vq1n for the fundamental negative-phase-sequence component, coordinate conversion is performed with a negative fundamental component phase.

In this case, as frequency components for which voltage distortion is considered, the fundamental positive-phase-sequence component, the fundamental negative-phase-sequence component, the fifth-order positive-phase-sequence component, the fifth-order negative-phase-sequence component, . . . , the kth-order positive-phase-sequence component, and the kth-order negative-phase-sequence component are targeted, and the respective dq-axis voltages (Vd1n, Vq1n), (Vd5p, Vq5p), (Vd5n, Vq5n), . . . , (Vdkp, Vqkp), and (Vdkn, Vqkn) are generated.

The dq-axis voltages generated for each frequency component pass a filter 102 by which harmonic components are removed from DC voltage. Then, regarding the values of the dq-axis voltages after the filter processing, the d-axis and q-axis voltages for each frequency component are squared by multipliers 103, and a square root of a sum obtained by adding the squared values is calculated by the square root calculator 104, thereby generating voltage amplitude values |V1p|, |V1n|, |V5p|, |V5n|, . . . , |Vkp|, and |Vkn| for the respective frequency components. The total sum of the generated voltage amplitude values is calculated by a total sum calculator 105, thereby generating the grid voltage maximum value Vsmax.

Thus, also in the case where voltage distortion occurs in the AC grid 1 at the time of grid voltage disturbance, the grid voltage maximum value Vsmax can be reliably calculated, the voltage and the current that the power converter 10 can output can be sufficiently used, and harmonic compensation can be effectively performed.

In calculation for the grid voltage maximum value Vsmax considering voltage distortion, as long as the fundamental positive-phase-sequence component is included, the other frequency components may be any frequency components.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC grid
2 load
10, 10A, 10B, 10C power converter
12, 12A converter cell
20, 20A control circuit
23, 23A, 230 harmonic compensation unit
30, 30A, 300 current command generation unit
31 compensation current command
32, 32a, 32b, 32c, 320 compensation current desired value
40, 40A, 40B, 40C, 40D limit coefficient calculation unit
100, 100A power conversion device
310 output current command
iload load current
Imax maximum current
Ih1 to Ihm, Ih1c, Ihh current upper limit value
Ih1a to Ihma, Ih1b, Ihha first current value
|I1nf| to |Iknf|, Ih second current value
Iha third current value
id1p active current command
iq1p reactive current command
Icir circulation current
K, Kh, K1n to Kkn limit coefficient
Vmax maximum voltage
Vh1 to Vhm, Vhh voltage upper limit value
Vsmax grid voltage maximum value
Vzero zero-phase-sequence voltage
XL fundamental impedance

The invention claimed is:

1. A power conversion device comprising:
a power converter connected to an AC grid to which a load is connected; and
a control circuitry to perform output control of the power converter, wherein
the control circuitry includes a harmonic compensation circuitry to compensate for harmonic current contained in load current by compensation current, and controls the compensation current in output current of the power converter, and
the harmonic compensation circuitry includes
a current command generation circuitry which generates a compensation current desired value for each of a plurality of frequency components, and corrects each compensation current desired value using a corresponding limit coefficient, to generate a compensation current command for each frequency component, and
a limit coefficient calculation circuitry which calculates each limit coefficient, on the basis of the compensation current desired value for each of the plurality of frequency components, and maximum voltage and maximum current that the power converter is able to output.

2. The power conversion device according to claim 1, wherein
the harmonic compensation circuitry generates the compensation current desired value for each of the plurality of frequency components on the basis of the load current.

3. The power conversion device according to claim 2, wherein
the harmonic compensation circuitry multiplies each compensation current desired value by the corresponding limit coefficient, to generate the compensation current command for each frequency component.

4. The power conversion device according to claim 2, wherein
for a frequency component that is a compensation target, the harmonic compensation circuitry calculates a voltage upper limit value and a current upper limit value, extracts a minimum value among a first current value calculated from the voltage upper limit value and an impedance based on the frequency, the current upper limit value, and a second current value based on an amplitude of the compensation current desired value, and divides the minimum value by the second current value, to calculate the limit coefficient.

5. The power conversion device according to claim 4, wherein
the harmonic compensation circuitry, with priorities set for respective frequency components that are compensation targets, calculates the voltage upper limit value and the current upper limit value in a descending order of the priorities.

6. The power conversion device according to claim 1, wherein
the harmonic compensation circuitry multiplies each compensation current desired value by the corresponding limit coefficient, to generate the compensation current command for each frequency component.

7. The power conversion device according to claim 6, wherein
for a frequency component that is a compensation target, the harmonic compensation circuitry calculates a voltage upper limit value and a current upper limit value, extracts a minimum value among a first current value calculated from the voltage upper limit value and an impedance based on the frequency, the current upper limit value, and a second current value based on an amplitude of the compensation current desired value, and divides the minimum value by the second current value, to calculate the limit coefficient.

8. The power conversion device according to claim 7, wherein
the harmonic compensation circuitry, with priorities set for respective frequency components that are compensation targets, calculates the voltage upper limit value and the current upper limit value in a descending order of the priorities.

9. The power conversion device according to claim 1, wherein
for a frequency component that is a compensation target, the harmonic compensation circuitry calculates a voltage upper limit value and a current upper limit value, extracts a minimum value among a first current value calculated from the voltage upper limit value and an impedance based on the frequency, the current upper limit value, and a second current value based on an amplitude of the compensation current desired value, and divides the minimum value by the second current value, to calculate the limit coefficient.

10. The power conversion device according to claim 9, wherein
the harmonic compensation circuitry, with priorities set for respective frequency components that are compensation targets, calculates the voltage upper limit value and the current upper limit value in a descending order of the priorities.

11. The power conversion device according to claim 10, wherein
the control circuitry generates a first current command for a fundamental positive-phase-sequence component, and adds the first current command and the compensation current command, to generate an output current command for the power converter, and
the harmonic compensation circuitry calculates the voltage upper limit value and the current upper limit value for the frequency component of which the priority is at a first rank, on the basis of the maximum voltage and the maximum current, and the first current command.

12. The power conversion device according to claim 10, wherein
the harmonic compensation circuitry calculates the limit coefficients using the voltage upper limit values and the current upper limit values only for the frequency components of which the priorities are at a second rank or below, and calculates the limit coefficient individually for the frequency component of which the priority is at a first rank.

13. The power conversion device according to claim 12, wherein
the harmonic compensation circuitry calculates the voltage upper limit value and the current upper limit value for the frequency component of which the priority is at the second rank, on the basis of the maximum voltage and the maximum current, and maximum current values respectively set for a fundamental positive-phase-sequence component and the frequency component of which the priority is at the first rank.

14. The power conversion device according to claim 10, wherein
for each frequency component that is the compensation target, the harmonic compensation circuitry calculates voltage and current to be allocated for the frequency component, and subtracts the calculated voltage and current respectively from the voltage upper limit value and the current upper limit value, to calculate the voltage upper limit value and the current upper limit value for the frequency component of which the priority is at a next rank.

15. The power conversion device according to claim 10, wherein
among the priorities set for the respective frequency components that are the compensation targets, priorities for a plurality of frequency components at a second rank or below are set at the same rank, and
for a group of the frequency components at the same rank of priority that are the compensation targets, the harmonic compensation circuitry
calculates the voltage upper limit value and the current upper limit value,
on the basis of amplitudes of the compensation current desired values for the group of frequency components, calculates the second current value which is an amplitude sum, and a third current value which is a sum of the amplitudes imparted with weights based on the respective frequencies,
extracts the minimum value among: the first current value based on the second current value, the third current value, the voltage upper limit value, and the impedance; the current upper limit value; and the second current value, and
divides the minimum value by the second current value, to calculate the limit coefficient.

16. The power conversion device according to claim 10, wherein
the frequency component of which the priority is at a first rank is a fundamental negative-phase-sequence component.

17. The power conversion device according to claim 9, wherein
the maximum voltage to be used for calculation by the harmonic compensation circuitry is corrected by voltage of the AC grid to which the power converter is connected.

18. The power conversion device according to claim 9, wherein
the power converter is configured as a modular multilevel converter in which a plurality of phases each including a plurality of converter cells are connected by single star connection, and
the control circuitry controls the converter cells so as to output zero-phase-sequence voltage for interphase balance, and the harmonic compensation circuitry uses the voltage upper limit value corrected by the zero-phase-sequence voltage.

19. The power conversion device according to claim 9, wherein the power converter is configured as a modular multilevel converter in which a plurality of phases each including a plurality of converter cells are connected by delta connection, and the control circuitry controls the converter cells so as to output circulation current for interphase balance, and the harmonic compensation circuitry uses the current upper limit value corrected by the circulation current.

20. The power conversion device according to claim 9, wherein the power converter is configured as a modular multilevel converter in which a plurality of phases each including a plurality of converter cells are connected by double star connection, and the control circuitry controls the converter cells so as to output circulation current for interphase balance, and the harmonic compensation circuitry uses the current upper limit value corrected by the circulation current.

\* \* \* \* \*